(12) United States Patent
Kim et al.

(10) Patent No.: US 8,761,658 B2
(45) Date of Patent: Jun. 24, 2014

(54) SYSTEM AND METHOD FOR A COMPUTERIZED LEARNING SYSTEM

(75) Inventors: Surrey Kim, Edmonton (CA); Borrey Kim, Edmonton (CA); Michael Alexander Kouritzin, Edmonton (CA); Garret Rieger, Edmonton (CA)

(73) Assignee: FastTrack Technologies Inc., Edmonton (CA)

( * ) Notice: Subject to any disclaimer, the term of this patent is extended or adjusted under 35 U.S.C. 154(b) by 550 days.

(21) Appl. No.: 13/018,331

(22) Filed: Jan. 31, 2011

(65) Prior Publication Data

US 2012/0196261 A1 Aug. 2, 2012

(51) Int. Cl.
*G09B 3/00* (2006.01)

(52) U.S. Cl.
USPC .......................... 434/350; 434/322

(58) Field of Classification Search
None
See application file for complete search history.

(56) References Cited

U.S. PATENT DOCUMENTS

| | | | |
|---|---|---|---|
| 5,059,127 A | 10/1991 | Lewis et al. | |
| 5,146,552 A | 9/1992 | Cassorla et al. | |
| 5,469,538 A | 11/1995 | Razdow | |
| 5,565,316 A | 10/1996 | Kershaw et al. | |
| 5,597,312 A * | 1/1997 | Bloom et al. | 434/362 |
| 5,623,406 A | 4/1997 | Ichbiah | |
| 5,690,497 A | 11/1997 | Clark et al. | |
| 5,743,746 A | 4/1998 | Ho et al. | |
| 5,779,486 A | 7/1998 | Ho et al. | |
| 5,813,863 A * | 9/1998 | Sloane et al. | 434/236 |
| 5,827,070 A * | 10/1998 | Kershaw et al. | 434/322 |
| 5,836,771 A | 11/1998 | Ho et al. | |
| 5,863,208 A | 1/1999 | Ho et al. | |
| 5,957,699 A * | 9/1999 | Peterson et al. | 434/350 |
| 5,987,302 A | 11/1999 | Driscoll et al. | |
| 6,000,945 A * | 12/1999 | Sanchez-Lazer et al. | 434/322 |
| 6,081,829 A | 6/2000 | Sidana | |
| 6,118,973 A | 9/2000 | Ho et al. | |
| 6,134,539 A | 10/2000 | O'Connor et al. | |
| 6,201,948 B1 * | 3/2001 | Cook et al. | 434/350 |
| 6,230,171 B1 | 5/2001 | Pacifici et al. | |
| 6,260,033 B1 | 7/2001 | Tatsuoka | |
| 6,270,352 B1 | 8/2001 | Ditto | |
| 6,301,462 B1 | 10/2001 | Freeman et al. | |
| 6,301,571 B1 | 10/2001 | Tatsuoka | |
| 6,442,370 B1 * | 8/2002 | Driscoll et al. | 434/350 |
| 6,442,692 B1 | 8/2002 | Zilberman | |
| 6,480,698 B2 | 11/2002 | Ho et al. | |
| 6,484,010 B1 | 11/2002 | Sheehan | |

(Continued)

FOREIGN PATENT DOCUMENTS

WO WO2007131068 11/2007

*Primary Examiner* — Robert J Utama
(74) *Attorney, Agent, or Firm* — Anthony R. Lambert

(57) ABSTRACT

There is a computerized learning system and method which updates a conditional estimate of a user signal representing a characteristic of a user based on observations including observations of user behavior. The conditional estimate may be updated using a non-linear filter. Learning tools may be generated using the computerized learning system based on distributions of desired characteristics of the learning tools. The learning tools may include educational items and assessment items. The learning tools may be requested by a user or automatically generated based on estimates of the user's characteristics. Permissions may be associated with the learning tools which may only allow delegation of permissions to other users of lower levels. The learning system includes a method for annotating learning tools and publishing those annotations. In-line text editors of scientific text allow users to edit and revised previously published documents.

19 Claims, 17 Drawing Sheets

(56) References Cited

U.S. PATENT DOCUMENTS

| | | | |
|---|---|---|---|
| 6,527,556 B1 | 3/2003 | Koskinen | |
| 6,687,878 B1 | 2/2004 | Eintracht et al. | |
| 6,704,741 B1 * | 3/2004 | Lively et al. | 1/1 |
| 6,826,595 B1 | 11/2004 | Barbash et al. | |
| 6,874,121 B1 | 3/2005 | Mayer | |
| 6,925,601 B2 | 8/2005 | Moore et al. | |
| 6,988,138 B1 | 1/2006 | Alcorn et al. | |
| 7,030,861 B1 | 4/2006 | Westerman et al. | |
| 7,052,277 B2 | 5/2006 | Kellman | |
| 7,058,550 B2 | 6/2006 | Kouritzin | |
| 7,103,508 B2 * | 9/2006 | Fujimori et al. | 702/185 |
| 7,137,821 B2 | 11/2006 | Jorgensen et al. | |
| 7,188,048 B2 | 3/2007 | Kouritzin et al. | |
| 7,201,580 B2 | 4/2007 | Ho et al. | |
| 7,286,793 B1 | 10/2007 | Miele | |
| 7,392,199 B2 | 6/2008 | Karlov et al. | |
| 7,418,458 B2 | 8/2008 | Bolt et al. | |
| 7,457,581 B2 | 11/2008 | Stout et al. | |
| 7,558,709 B2 | 7/2009 | Subbarao | |
| 7,628,614 B2 | 12/2009 | Templin | |
| 7,743,746 B2 | 6/2010 | Maier et al. | |
| 7,861,306 B2 | 12/2010 | DeMello et al. | |
| 2002/0198681 A1 | 12/2002 | Kouritzin et al. | |
| 2003/0017442 A1 | 1/2003 | Tudor et al. | |
| 2004/0002040 A1 * | 1/2004 | Foley et al. | 434/118 |
| 2006/0059214 A1 | 3/2006 | Sargent, III et al. | |
| 2006/0059217 A1 | 3/2006 | Sargent, III et al. | |
| 2006/0141438 A1 * | 6/2006 | Chang et al. | 434/350 |
| 2007/0172808 A1 | 7/2007 | Capone | |
| 2007/0259326 A1 * | 11/2007 | Marco | 434/350 |
| 2009/0281792 A1 * | 11/2009 | Green et al. | 704/9 |

* cited by examiner

SYSTEM AND METHOD FOR A COMPUTERIZED LEARNING SYSTEM

TECHNICAL FIELD

This patent document relates to managing information within an electronic learning system. In particular, this patent document relates to generating learning tools and estimating characteristics of users and learning tools within an electronic learning system.

BACKGROUND

Increasingly, more and more tests are being administered using electronic resources. Students may take examinations through online testing systems which may provide adaptive testing.

In one system, U.S. Pat. No. 7,628,614 describes a method for estimating examinee attribute parameters in cognitive diagnosis models. The patent describes estimating for each assessment one or more item parameters and also describes tracking item responses by considering various examinee parameters. Although many systems determine a user's responses to an examination question item, those systems do not consider user behavior that may be related to the user's responses within the examination or more importantly user's proficiency. By focusing on solely examination question item response data, those systems fail to consider the wealth of information that may be collected within a computerized learning system.

Many assessment systems only track the ability of the user and neither consider nor attempt to improve the performance of the students. These systems also fail to recognize the potential uses for the vast amount of information that may be detected while a user accesses a learning system. Moreover, some current methods of interpreting data are unable to cope with the high volume and plethora in types of traffic information that potentially may be collected during an educational or assessment session. Large amounts of data and types of activity traffic may prove to be difficult to effectively model and process in order to discover useful information. Many assessment systems therefore only track data associated with user's responses during examination.

Also, it may be difficult and time consuming for instructors to create new examinations and furthermore prepare students by creating additional practice examinations. Traditional methods involve picking questions from a textbook or from past exam in an attempt to make a mock exams and even the examination themselves. Such methods are not only onerous to instructors but more importantly, especially in a multi-section course setup, can lead to a bias in picking questions similar to an already known final in their instruction or mock exams. Some basic methods have been developed by other to generate random problem sets (i.e. different questions), but such methods are too primitive for actual use in creating a well balance exam in terms of distribution of difficulty and variety of questions contained, thus have only be used in low stakes homework. Furthermore full solutions are almost never provided, only the final solution. The lack of a method for simulation exam questions with full solution is detrimental in helping students prepare and study in an effective and smarter manner.

In any sizeable group of students, typically, students will struggle in different study areas or be at different proficiency levels for the same learning objective. An instructor will typically tailor instruction to the average student group leaving weaker students frustrated and lost and stronger students unchallenged. The traditional education system fails to tailor education items and examination items for the needs of each individual student.

Traditionally, courses are designed by professors with experience on what topics must be covered during a semester and in what proportions. Information about student progress can only be found during examinations and in traditional systems, this information is not easily presented and cannot be used to determine the effectiveness and quality of specific learning resources, courseware, textbooks, activities and schedule.

SUMMARY

In an embodiment there is method for updating and using a conditional estimate of a signal in a computerized learning system. Observations of user behavior are obtained through user interaction with the computerized learning system. A conditional estimate of a user signal representing a characteristic of a user is updated based on the observations. The conditional estimate of the signal is used to generate at least a learning tool and a report.

In an embodiment there is a method for updating and using a conditional estimate of a signal in a computerized learning system. Observations are obtained through user interaction with the computerized learning system. A conditional estimate of a signal representing a characteristic of a learning tool and a characteristic of a user is updated based on the observations using a non-linear filter. The conditional estimate of the signal is used to generate at least one of the following the or a second learning tool and a report.

In an embodiment there is a method of storing data in a computer database. A plurality of learning objectives associated with at least one of a user and a learning tool is stored. For each learning objective a probabilistic distribution representing a characteristic rating for the learning objective is assigned.

In an embodiment there is a method of generating learning tools within a computerized learning system. A plurality of learning tools is stored within a database, each one of the plurality of learning tools is associated with a plurality of characteristics. A request in the form of a distribution of desired characteristics is received. A subset of the plurality of learning tools having a plurality of characteristics satisfying the requested distribution of desired characteristics is generated.

In an embodiment there is a method of a generating learning tool for a user within a computerized learning system. A request for a learning tool satisfying a distribution of desired characteristics is submitted. A learning tool is received from a server, the learning tool satisfying a distribution of desired characteristics for the learning tool.

In an embodiment there is a method for assigning rights associated with learning tools in a computerized learning system. For an action corresponding to a learning tool associated with a user, a permission object is assigned. The permission object is capable of being assigned each one of the following permissions: a super grant permission, wherein the user is capable of performing the action and the user is capable of delegating any level of permission related to the action to a subsequent user; a grant permission, wherein the user is capable of performing the action and the user is capable of delegating a yes permission related to the action to the subsequent user; the yes permission, wherein the user is capable of performing the action and the user is unable to delegate any level of permission; and a no permission, wherein the user cannot perform the action and the user is unable to delegate any level of permission.

In an embodiment there is a computer program product comprising a non-transitive computer readable medium having encoded thereon computer executable instructions for implementing the methods described herein.

In an embodiment there is a method of adapting an educational and assessment system for a user. Educational items and assessment items are stored in a database. The following is repeated for a plurality of users, a plurality of assessment items and a plurality of educational items: (a) updating a characteristic of a user of the plurality of users and a characteristic of an assessment item of the plurality of assessment items based on interaction between the user and assessment item, (b) and updating the characteristic of the user of a plurality of users and a characteristic of a first educational item based on interaction between the user and the first educational item. At least one of an educational item of the plurality of educational items, an assessment item of the plurality of assessment items is presented to a selected user of the plurality of users to generate a desired effect on the user based on the characteristic of the user.

In an embodiment there is a method of integrating scientific symbols in-line with text in content within a computerized learning system. The method switches from text mode into scientific mode. Plain-language text input is converted into scientific code. A graphical representation of the scientific code is displayed in-line with the text. The plain-language text input is adaptively predicted using context-based prediction.

In an embodiment there is a method for annotating learning tools within a computerized learning system. A first user's annotation of a learning tool is stored in the computerized learning system, the learning tool having a plurality of characteristic. At least a second user of a plurality of users is permitted to have access to the annotated learning tool. A learning tool object corresponding to the annotated learning tool is created, the annotated learning tool having a plurality of characteristics. A subset of the plurality of characteristics of the annotated learning tool is set to be the same as the plurality of characteristics of the learning tool.

These and other aspects of the device and method are set out in the claims, which are incorporated here by reference.

BRIEF DESCRIPTION OF THE FIGURES

Embodiments will now be described with reference to the figures, in which like reference characters denote like elements, by way of example, and in which.

DETAILED DESCRIPTION

Figure 1:
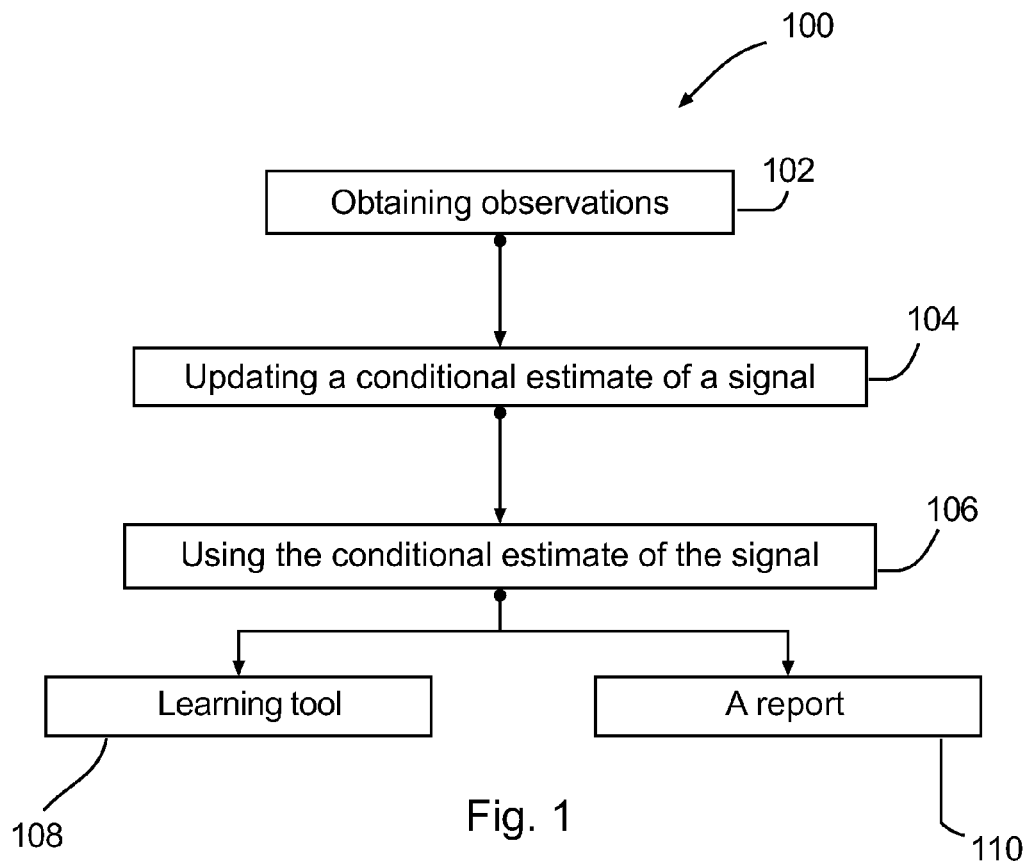
FIG. 1 is a flow chart showing a method of estimating a signal of a user.

As shown in FIG. 1, there is a method 100 for updating and using a conditional estimate of a signal in a computerized learning system. Observations of user behavior are obtained 102 through user interaction with the computerized learning system. A conditional estimate of a user signal representing a characteristic of a user is updated 104 based on the observations. The conditional estimate of the signal is used 106 to generate at least a learning tool 108 and a report 110.

In an embodiment of the method 100, the observations that are obtained through user interaction with the computerized learning system also include answers given by user in response to assessment items. The conditional estimate of the signal 104 may represent both a characteristic of a learning tool and a characteristic of a user and the conditional estimate may be updated based on the observations using a non-linear filter.

Figure 2:
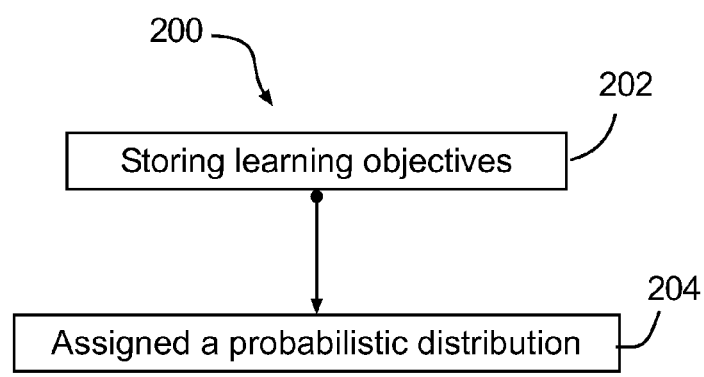
FIG. 2 is a flow chart showing a method of storing a probabilistic distribution.
Figure 8:
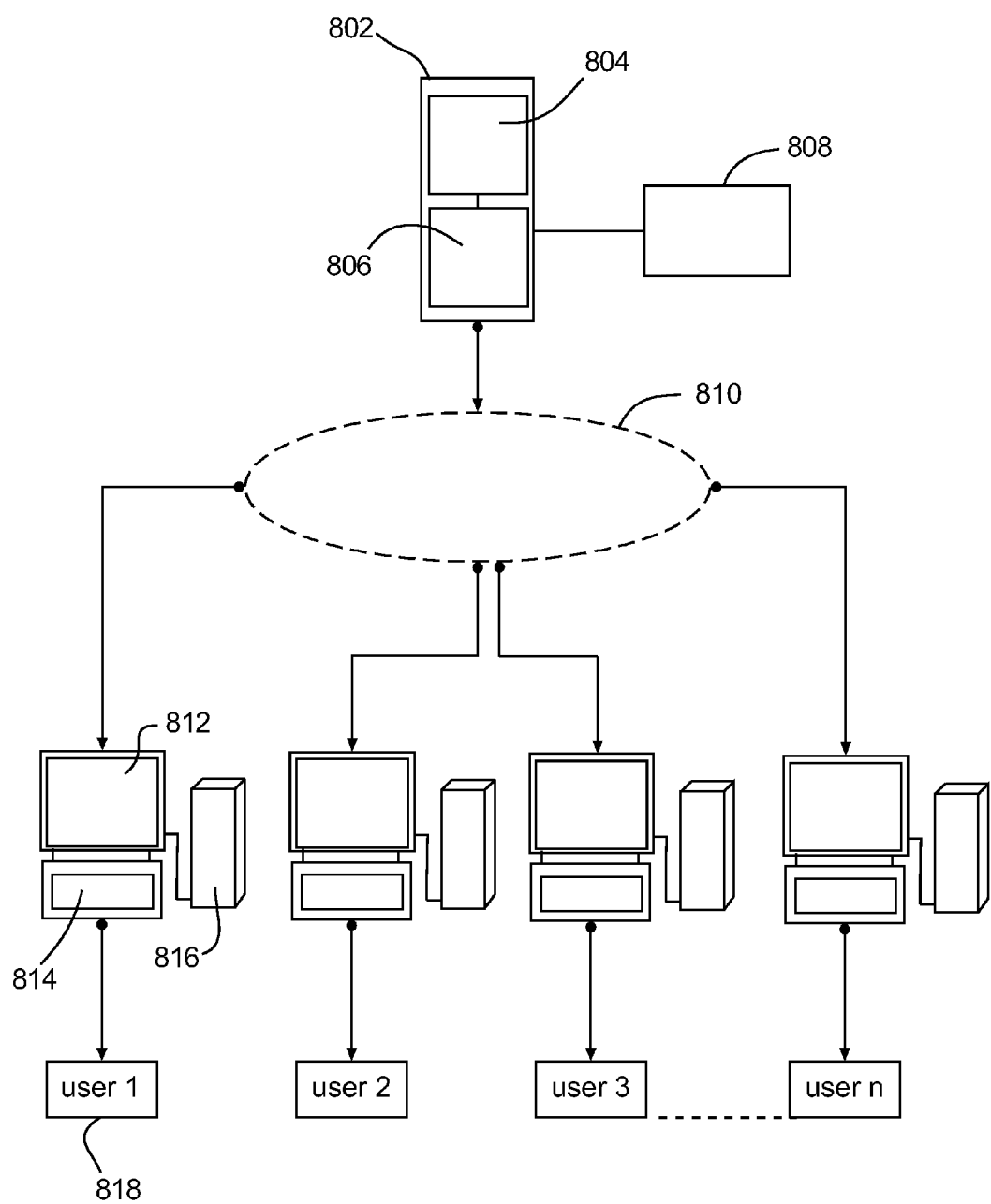
FIG. 8 shows a plan diagram of a computerized learning system.

As shown in FIG. 2, there is a method 200 of storing data in a computer database 808 (FIG. 8). A plurality of learning objectives associated with at least one of a user and a learning tool is stored 202. For each learning objective a probabilistic distribution representing a characteristic rating for the learning objective is assigned 204.

Figure 3:
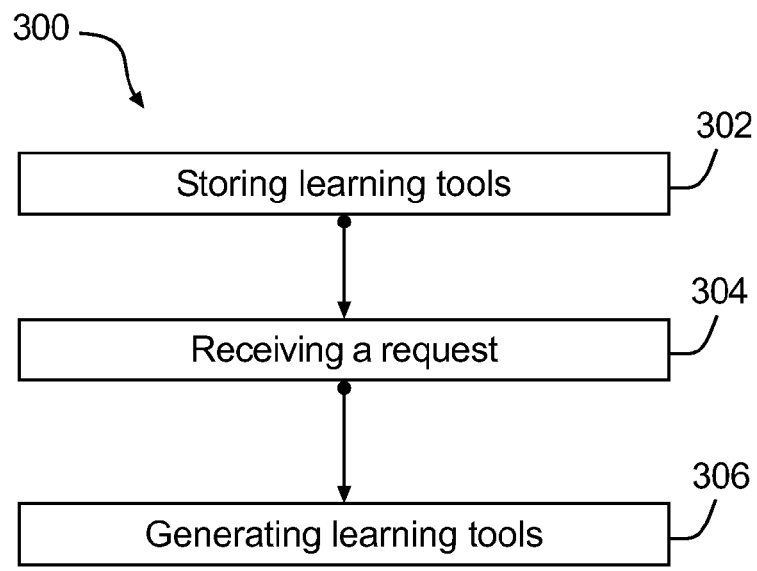
FIG. 3 is a flow chart showing a method of generating learning tools.

As shown in FIG. 3, there is a method 300 of generating learning tools within a computerized learning system. A plurality of learning tools is stored 302 within a database 808 (FIG. 8), each one of the plurality of learning tools is associated with a plurality of characteristics. A request 304 in the form of a distribution of desired characteristics is received. A subset of the plurality of learning tools having a plurality of characteristics satisfying the requested distribution of desired characteristics is generated 306.

Figure 4:
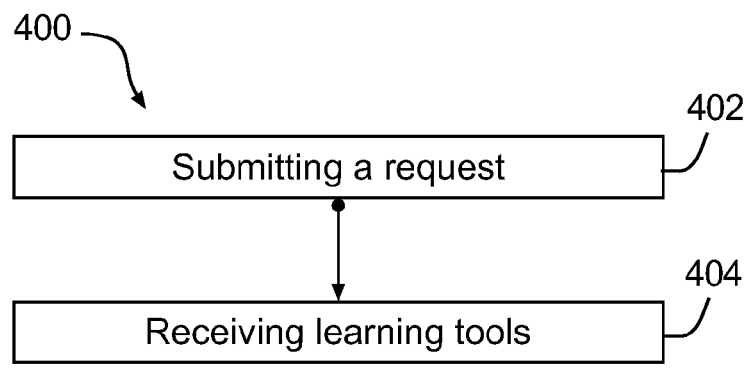
FIG. 4 is a flow chart showing a method of requesting and generating learning tools.

As shown in FIG. 4 there is a method 400 of generating learning tools for a user 818 (FIG. 8) within a computerized learning system. A request 402 for a learning tool satisfying a distribution of desired characteristics is submitted. The learning tool is received 404 from a server 810 (FIG. 8), the learning tool satisfies a distribution of desired characteristics for the learning tool.

Figure 5:
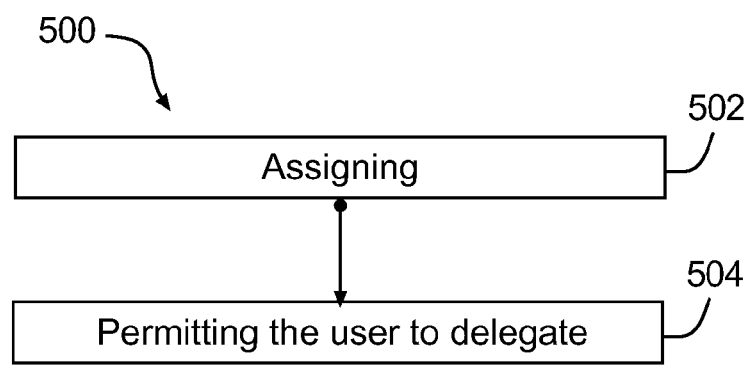
FIG. 5 is a flow chart showing a method of delegating user permissions.

As shown in FIG. 5 there is a method 500 for assigning rights associated with learning tools in a computerized learning system. For an action corresponding to a learning tool associated with a user, a permission object is assigned 502. The permission object is capable of being assigned each one of the following permissions at 504: a super grant permission, wherein the user is capable of performing the action and the user is capable of delegating any level of permission related to the action to a subsequent user; a grant permission, wherein the user is capable of performing the action and the user is capable of delegating a yes permission related to the action to the subsequent user; the yes permission, wherein the user is capable of performing the action and the user is unable to delegate any level of permission to the subsequent user; and a no permission, wherein the user cannot perform the action and the user is unable to delegate any level of permission to the subsequent user.

Figure 6:
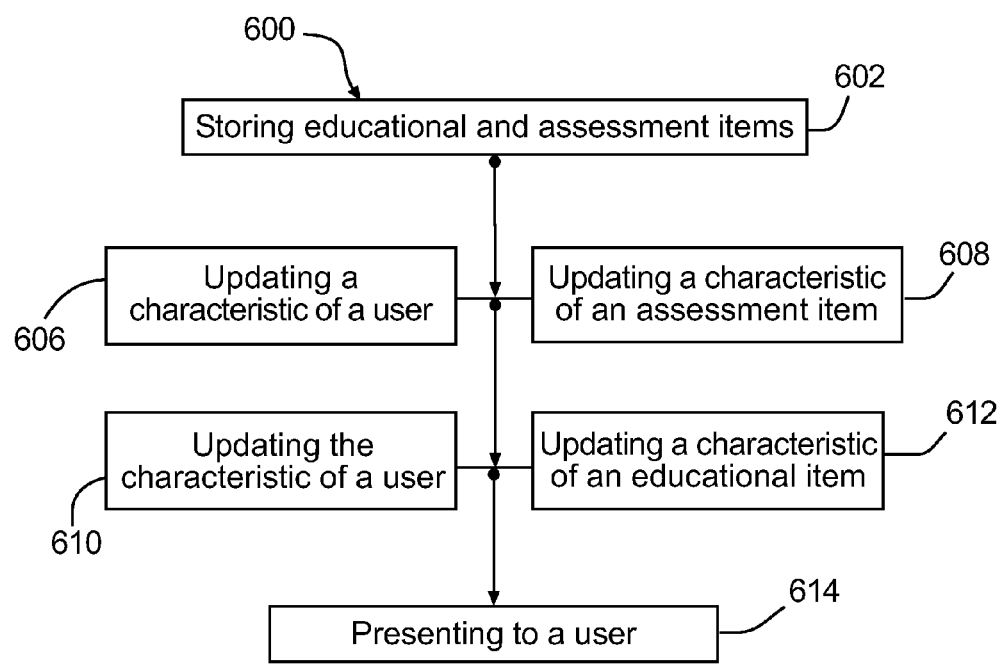
FIG. 6 is flow chart showing a method for updating characteristics of users, assessment items and educational items.

As shown in FIG. 6 there is a method 600 for adapting an educational and assessment system for a user. Educational items and assessment items are stored in a database 602. Repeating the following for a plurality of users, a plurality of assessment items and a plurality of educational items: (a) updating 606 a characteristic of a user of the plurality of users and updating 608 a characteristic of an assessment item of the plurality of assessment items based on interaction between the user and assessment item, and (b) updating 610 the characteristic of the user of a plurality of users and updating 612 a characteristic of a first educational item based on interaction between the user and the first educational item. At least one of an educational item of the plurality of educational items, an assessment item of the plurality of assessment items is presented 614 to a selected user of the plurality of users to generate a desired effect on the user based on the characteristic of the user.

Figure 7A:
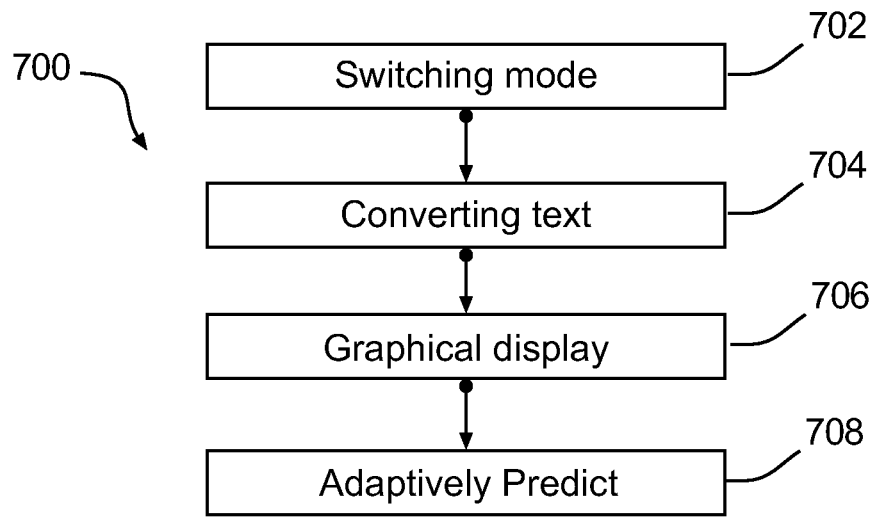
FIG. 7 is a flow chart showing a method of annotating learning tools.

In FIG. 7A there is a method 700 of integrating scientific symbols in-line with text in content within a computerized learning system. The method switches 702 from text mode into scientific mode. Plain-language text input is converted 704 into scientific code. A graphical representation of the scientific code is displayed 706 in-line with the text. The plain-language text input is adaptively predicted 708 using context-based prediction.

Figure 7B:
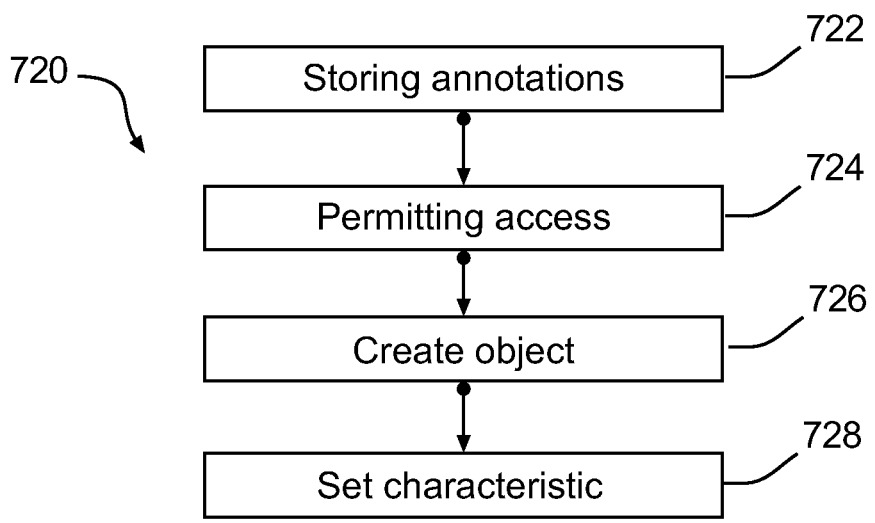

In FIG. 7B there is a method 720 for annotating learning tools within a computerized learning system. A first user's annotation of a learning tool is stored 722 in the computerized learning system, the learning tool having a plurality of characteristics. At least a second user of a plurality of users is permitted to have access 724 to the annotated learning tool. A learning tool object corresponding to the annotated learning tool is created 726, the annotated learning tool having a plurality of characteristics. A subset of the plurality of characteristics of the annotated learning tool is set 728 to be the same as the plurality of characteristics of the learning tool.

In an embodiment there is a computer program product comprising a non-transitive computer readable medium having encoded thereon computer executable instructions for implementing the methods described herein.

For ease of explanation, consistent notations and symbols will be used to describe the system and method. The various notations and symbols used to describe the system are exemplary only and are intended to assist the reader in understanding the system and method.

Objects: The notation used to describe data structure objects is presented in an object-oriented format. A data structure object type will be labeled by a symbol, where a symbol is either one or more italicized letters of the English or Greek alphabet. For the ease of recognition and meaning, these symbols may be denoted as underscored or italicized words.

Time: The italicized letter t will be reserved to indicate time which may further be indexed (e.g. $t_k$ where $k \in \{0, 1, 2, \ldots, K\}$) and will be used to reference an instance of an object at a point in time using subscript notation (e.g. object X at time $t_k$, is denoted by $X_{t_k}$).

Collections: Superscript position on an object will be reserved for indexing objects within a collection or set of objects of the same type. For example $X_{t_k}^i$ references the ith object in a collection $\{X^j\}_{j=1}^N$ at time $t_k$ (i.e. $X^i \in \{X^j\}_{j=1}^N$ where $1 \leq i \leq N$).

Fields: These data structure objects may have data member fields which are either references to instances of other object types, a single numerical value, an n-dimensional array of numerical values or an n-dimensional array of references to instances of other object types.

A particular field for an object will be labeled by the symbol $\alpha_i$ where subscript i denotes the ith field for the object followed by either a single or n element list enclosed in round brackets.

For both a single and n element list, the first element will denote the data structure object that the member data field belongs to, whereas for the n element lists, the remaining n−1 element(s) will indicate (n−1)-dimensional array indices. For example $\alpha_2(X) \in \mathbb{R}$ means that the $2^{nd}$ field for object X is a real numbered value, and $\alpha_6(X, 1, 4, 23) \in \{0, 1, 2, \ldots, N\}$ means that the $6^{th}$ field for object X at array position (1, 4, 23) is an integer value from zero to N.

User means any arbitrary individual or group who has access to the computerized learning system. For example, a user may be (a) an instructor-user or "instructor",
(b) an author-user or "author",
(c) guest-user or "guest",
(d) student-user or "student" or "learner",
(e) consumer-user or "consumer", and
(f) proctor-user or "proctor"

each as an individual user or a user group.

An individual may be a member of more than one of the user-types listed above. For example, a student learner may also be an author if the student publishes annotations relating to course material. Similarly, an instructor in one course may be a learner in a different course.

Objects

Learning Objectives or Learning Outcomes ("LO" or "LOG" to Represent Learning Objective Groups)

A learning objective is a characteristic of a learning tool that represents an objective that an education tool is intended to achieve or which an assessment tool is intended to test. The learning objective may be specific, such as testing a user's ability to answer a specific question or may be general, such as describing a subject-area which an educational item is intended to teach. For example, the learning object may include the content relating to an assessment question. The activity refers to the type of activity associated with the learning tool. Using mathematics as an example, a question may require a student to prove a statement, provide a counter-example, solve for an equation or variable or perform some other activity which serves to test a user's understanding of mathematics.

We denote learning objective $L^l \in \{L^j\}_{j=1}^{|L|}$ where $1 \leq l \leq |L|$. In an embodiment, each learning objective object $L^l$ has the following attribute fields:

TABLE 1

| j | Symbol | Description of field j for $L^l$ |
|---|--------|----------------------------------|
| 0 | $\alpha_0(L^l, k) \in \{L^j\}_{j=1}^{|L|}$ Recursive Structure | Recursive Structure: In an embodiment, we recursively define a learning objective as a collection |

TABLE 1-continued

| j | Symbol | Description of field j for $L^l$ |
|---|--------|-------------------------------|
|   |        | of other resources. The base atom or smallest indivisible unit is the (action, object)-pair. |
| 1 | $\alpha_1\left(L^1, \begin{bmatrix} \text{action} \\ \text{object} \end{bmatrix}\right) \in \{\text{Yes, No}\}$ <br> 2-Tuple (action, object) | 2-Tuple (action, object): In an embodiment, we define and represent learning objectives as the 2-tuple (action, object) where action is represents learning activities (verbs), object represent the learning objects (nouns or statements). For example: ("Prove", "equation $2x^5 - 3x^2 + 4x + 5 = 0$ has at least one real root") In an embodiment, learning objectives may be stored as granular topics (just the objects) within a course or subject grade level. For example: ("the Intermediate Value Theorem") or ("power rule for differentiation of polynomial functions"). |

Learning Resources

Learning tools, or learning resources, are content items within a computerized learning system which can be accessed by users to facilitate learning or to provide assessment. Learning tools may be provided to a consumer-user directly through the system or via a link. Examples of learning tools include educational items such as eBooks readings, audible lectures, interactive examples, follow-up training sessions, virtual tutoring sessions and assessment items, such as assignments, examinations, laboratories and exercises.

Learning tools may be associated with one or more characteristics. Characteristics of a learning tool may include attributes of the learning tools such as the learning objectives, the learning style, the difficulty, the effectiveness, the motivation rating, the popularity, the format availability, the time associated with and the type of the learning tool. The quality of a learning tool may include a variety of different types of quality ratings. The quality of the learning tool may be determined by the effectiveness of the learning tool to produce an improvement in a learner's proficiency from one level to a higher level. Quality may also be determined based on the clarity of communication within the learning tool. Quality may also be determined based on the teaching quality of the learning tool in producing a desired teaching result. Motivation includes the ability of a learning tool to motivate a user to learn material or respond to an assessment. For example, a short educational video clip may improve a user's motivation in a subject area, whereas a lengthy and complicated reading passage may correspond to a low motivation level. The popularity of a learning tool may be determined based on a user response to the learning tool. The format availability of a learning tool may include tools to enable auditory, visual or tactile interaction with the learning tool, for example to assist users with disabilities. The total time associated with the learning tool is a measure of the length of time a user is expected to require to consume an educational item or to complete an assessment item. The system may also provide scheduling related information for the learning tool, for example including the time the learning tool is made available to a user and the amount of time a user has to consume the resource.

The resource type may be any type of resource which may provide educational to or assessment of a user, such as eBooks, audible lectures, interactive lectures, training sessions, virtual tutoring, homework assignments, full solution to assessment items, lecture notes, algorithmic/templated questions or exercises, accessible for visually impaired (for example, with WAI-ARIA 1.0 standards for screen readers), courseware, Learning Objective Map or Course Blueprints, Questions, Homework assignments, Exams, lab work, eWorksheets, algorithmic/template, SmartPlot Questions include graphics. The types of learning tools may include as subsets learning tools of a different type. For example, a course blueprint learning tool may include various other learning tools such as homework assignments, examinations, lectures and training sessions.

A learning tool may be formed as a collection of various learning tools. The base atom or smallest indivisible unit is a paragraph. For example, a course eBook may be formed from a collection of chapters, each of which is formed from a collection of topics, and each topic may be formed from a variety of paragraphs. Although smaller divisions than paragraphs may be possible, it becomes increasingly difficult to determine a learning objective related to learning tools divided beyond a paragraph. By allowing learning tools to be made up of a series of nested resources, the computerized learning system can provide a large number of permutations for content items. For example, eBooks which cover similar topic areas, may nonetheless include a great variety in terms of specific paragraphs or paragraph orders within the books. For example, a professor may wish to use a course content item for a class that contains topics in various different areas, and then generate course content items with different formats based on the motivation of individual students while teaching the same overall content.

An exemplary list of characteristics for learning tools is set out in Table 2. In some embodiments the computerized learning system may track one or more of the characteristics set out in Table 2.

In an embodiment, we denote resources by $R^r \in \{R^j\}_{j=1}^{|R|}$ where $1 \leq r \leq |R|$. In an embodiment, each resource $R^r$ has the following attribute fields:

TABLE 2

| j | Symbol | Description of field j for $R^r$ |
|---|--------|----------------------------------|
| 0 | $\alpha_0(R^r, k) \in \{R^j\}_{j=1}^{|R|}$, where $0 \leq k \leq |\alpha_0(R^r)|$. The kth Segment of $R^r$ is also a resource. | Recursive Structure: In an embodiment, we recursively define a resource as an ordered sequence of other resources. For example: In the case this resource object is a paragraph then $|\alpha_0(R^r)| = 1$ and $\alpha_0(R^r, 1) = R^r$. If this is not the case, it is then intended that the consumer-user would first consume resource $\alpha_0(R^r, 1)$ then $\alpha_0(R^r, 2)$, then $\alpha_0(R^r, 3)$ and so forth. |

TABLE 2-continued

| j | Symbol | Description of field j for $R^r$ |
|---|---|---|
| 1 | $\alpha_1(R^r, l) \in \{0, 1, \ldots 6\}$<br>Learning Objective Difficulty | Learning Objective Difficulty: In an embodiment, we may want to describe the difficulty level for each learning objective.<br>For example, a difficulty level may be considered as a discrete value category from 0 to 6 rating the expected score for this assessment on the $L^l \in \{L^j\}_{j=1}^{|L|}$. |
| 2 | $\alpha_2(R^r, l) \in \{0, 1, \ldots 10\}$<br>Effectiveness/Quality Level | Effectiveness: In an embodiment, one may wish to assign a quality and effectiveness rating for the assessment.<br>For example, the effectiveness/quality level may be considered a discrete value category from 0 to 10 rating the question's quality for $L^l \in \{L^j\}_{j=1}^{|L|}$. |
| 2 alt. | $(\alpha_{2\_alt}(R^r, l, a, b) \in \{0, 1, \ldots 10\}$<br>Proficiency Transition Quality | Proficiency Transition Quality: In an embodiment we may wish to describe the effectiveness of resource for a given Proficiency Transition Quality.<br>For example, the proficiency transition effectiveness level may be considered as a discrete value category from 0 to 10 rating for going from proficiency level a to b. |
| 3 | $\alpha_3(R^r) \in \{0, 1, \ldots 10\}$<br>Teaching Quality Level | Overall Teaching Quality: In an embodiment, one may wish to add teaching quality levels.<br>For example, teaching quality levels may be considered as discrete value categories from 0 to 10. |
| 4 | $\alpha_4(R^r) \in \{0, 1, \ldots 10\}$<br>Communication Quality Level | Overall Communication Quality: In an embodiment, one may wish to add communication quality levels.<br>For example, communication quality levels may be considered as discrete value categories from 0 to 10. |
| 5 | $\alpha_5(R^r) \in \{-3, -2, \ldots 3\}$<br>Extrinsic Motivation Rating | Extrinsic Motivation Rating: In an embodiment, one may wish to add extrinsic motivation rating levels.<br>For example, extrinsic motivation rating levels may be considered as a discrete value categories from −3 to +3 which indicate the influence on a user's extrinsic motivation.<br>For example, if this assessment $R^r$ was scheduled to be a final exam, then one would expect that $\alpha_5(R^r)$ to be +2 or +3 (i.e. highly motivated).<br>Another example: for learning resource types, one may wish to incorporate sponsorship presence, popularity rating (below), communication quality and teaching quality to resource's extrinsic motivation rating. A sponsor can be from industry, research centers or even labeled or linked with motivation real-life scenarios, data sets or contests. Sponsored questions are motivating for student-users in consuming this resource. |
| 6 | $\alpha_6(R^r) \in \{0, 1, \ldots 10\}$<br>Popularity Level | Popularity Rating: In an embodiment, one may wish to add to the state space a popularity rating score.<br>For example, popularity levels may be considered as discrete value categories from 0 to 10. |
| 7 | $\alpha_7(R^r) \in \{Yes, No\}$<br>Visual Preference Level | Learning Style: In an embodiment, one may wish to add to the state space the following types of learning style information: visual, auditory and tactile/kinesthetic preference level. |
| 8 | $\alpha_8(R^r) \in \{Yes, No\}$<br>Auditory Preference Level | Typically, these values would be set by the author or inherited by the feature/tool which presents the resource to the end user. |
| 9 | $\alpha_9(R^r) \in \{Yes, No\}$<br>Tactile/Kinesthetic Preference Level | For example, visual, auditory and tactile/kinesthetic preference levels may be considered as either be applicable or not with a Yes or a No. |
| 10 | $\alpha_{10}(R^r, i) \in \{Yes, No\}$<br>Estimated Total Time | Estimated Total Time: the mean or expected time for learning or answering $R^r$ depending on the context.<br>In an embodiment, we discretize time, but alternatively, estimated total time can be a real number. I.e. $\alpha_{10}(R^r) \in \mathbb{R}$. |
| 11 | $\alpha_{11}(R^r) \in \{1, 2, 3, \ldots\}$<br>Number of Segments | Number of Segments: the mean or expected time for learning or answering $R^r$ depending on the context.<br>Note: $\alpha_{11}(R^r) = |\alpha_0(R^r)|$ |
| 12 | $\alpha_{12}(R^r) \in \{U^j\}_{j=1}^{|U|}$<br>Assignment | Assignment: Assigns student groups to which this resource object is published, shared or linked. |
| 13 | $\alpha_{13}(R^r, k) \in \mathbb{R}$, where $0 \le k \le |\alpha_0(R^r)|$. | Posting Schedule: It is intended that the kth segment of this resource $R^r$ will be posted at time |

TABLE 2-continued

| j | Symbol | Description of field j for $R^r$ |
|---|---|---|
| | Posting Schedule | $\alpha_{13}(R^r, k)$ for user or user group $\alpha_{12}(R^r)$ to consume. Posting time is the earliest date and time in which resource $R^r$ can be consumed by a user $\alpha_{12}(R^r)$. In another embodiment, we may wish to store in addition or in lieu of date/time the offsets from segment $k - 1$'s start time. In an embodiment, we may further wish to add the flexibility for a user to described time in offsets from segment $k - 1$'s end time. |
| 14 | $\alpha_{14}(R^r, k) \in \mathbb{R}$, where $0 \le k \le |\alpha_0(R^r)|$. Due Date & Time | Due Date & Time: It is intended that the kth segment of this resource $R^r$ will be due at time $\alpha_{14}(R^r, k)$ for user or user group $\alpha_{12}(R^r)$. Due date and time is the latest date and time in which resource $R^r$ can be consumed by a user $\alpha_{12}(R^r)$. In another embodiment, we may wish to store in addition or in lieu of date/time the offsets from segment $k - 1$'s start time. In an embodiment, we may further wish to add the flexibility for a user to described time in offsets from segment $k - 1$'s end time. |
| 15 | $\alpha_{15}(R^r) \in \mathbb{R}$ Average Workload | Average Workload: In an embodiment, describe workload by the estimated time divided by due date & time minus posting time. I.e. $$\alpha_{15}(R^r) = \frac{1}{|\alpha_0(R^r)|} \sum_{k=1}^{|\alpha_0(R^r)|} \frac{\alpha_{10}(\alpha_0(R^r, k))}{\alpha_{14}(R^r, k) - \alpha_{13}(R^r, k)}$$ |
| 16 | $\alpha_{16}(R^r) \in \mathbb{R}$ Average Learning Rate | Average Learning Rate: In an embodiment, we describe learning rate by the following: $$\alpha_{16}(R^r) = \sum_{a=0}^{6} \sum_{b=0}^{6} \frac{\alpha_{2-alt}(R^r, m, a, b)(b - a)}{10\alpha_{10}(R^r)}$$ |
| $\tau$ | $\alpha_\tau(R^r, c) \in \{Yes, No\}$ Resource Type | Type/Format: In an embodiment, one may wish to assign learning resources into one or more type of category: |

| c | Type Category |
|---|---|
| 1 | eBook |
| 2 | audible lecture |
| 3 | interactive |
| 4 | training session |
| 5 | virtual tutoring |
| 6 | homework |
| 7 | full solution |
| 8 | lecture notes |
| 9 | algorithmic/templated |
| 10 | accessible for visually impaired (WAI-ARIA 1.0 standards for screen readers). |
| 11 | Courseware: (defined below) |
| 12 | Course Template: (defined below) |
| 13 | Question |
| 14 | homework |
| 15 | Exam |
| 16 | lab work |
| 17 | eWorksheet |
| 18 | algorithmic/templated |
| 19 | Interactive/educational games |
| 20 | learning activity |
| 21 | assessment activity |
| 22 | authoring/editing activity etc . . . |

Courseware or Study Plan

In an embodiment, we define courseware as a scheduled resource which has within its $|\alpha_0(R^r)|$ segments a variety of resource types. I.e. The kth segment $\alpha_0(R^r, k) \in \{R^j\}_{j=1}^{|R|}$ can be: scheduled eBook readings activities, audible lecture activities, weekly homework, labs and quizzes, midterm exams and final.

User Object

In general, the user is modeled as a collection of characteristics or attributes associated with a user. Features of users such as a user's level of LO proficiency (mastery), interpersonal skills (e.g. teaching quality), motivation, and learning style & learning type preference may all be modeled within the system. A user may be described using one or more of characteristics mentioned in Table 3.

TABLE 3

| j | Symbol | Description of field j for $U^u$ |
|---|--------|----------------------------------|
| 0 | $\alpha_0(U^u, k) \in \{U^j\}_{j=1}^{|U|}$<br>Structure | Grouping of Users: In an embodiment, we recursively define users as collections of users. The base atom or smallest indivisible unit is a user representing an individual. |
| 1 | $\alpha_1(U^u, l) \in \{0, 1, \ldots 6\}$<br>Proficiency Level | Proficiency: In an embodiment one may wish to classify for each LO the individual's proficiency level (i.e. $L^l \in \{L^j\}_{j=1}^{|L|}$ where $1 \leq l \leq |L|$). For example, a proficiency level may be considered as a discrete value category from 0 to 6 rating the user's knowledge and ability to perform $L^l$. |
| 2 | $\alpha_2(U^u, l, a, b) \in \{0, 1, \ldots 10\}$<br>Learning Effectiveness Level | Learning Effectiveness: In an embodiment, one may wish to add to the state space the individual's learning effectiveness or learning rate level for each LO the individual's proficiency level (i.e. $L^l \in \{L^j\}_{j=1}^{|L|}$ where $1 \leq l \leq |L|$). For example, the learning effectiveness level may be considered as a discrete value category from 0 to 10 rating for going from proficiency level a to b. |
| 3 | $\alpha_3(U^u) \in \{0, 1, \ldots 10\}$<br>Teaching Skill Level | Interpersonal Skills: In an embodiment, one may wish to add to the state space some or all of the following types of interpersonal skills: listening, teaching, questioning, communication, and presentation skills. Herein, we only describe skill levels for the following: teaching and communication. For example, teaching and communication skill levels may be considered as a discrete value categories from 0 to 10. |
| 4 | $\alpha_4(U^u) \in \{0, 1, \ldots 10\}$<br>Communication Skill Level | |
| 5 | $\alpha_5(U^u] \in \{-3, -2, \ldots 3\}$<br>Extrinsic Motivation Level | Motivation: In an embodiment, one may wish to add to the state space the following types of motivation: long term intrinsic level and short term extrinsic level. For example, intrinsic and extrinsic motivation levels may be considered as a discrete value categories from −3 to −3. |
| 6 | $\alpha_6(U^u) \in \{-3, -2, \ldots 3\}$<br>Intrinsic Motivation Level | |
| 7 | $\alpha_7(U^u) \in \{1, 2, \ldots 5\}$<br>Visual Preference Level | Style: In an embodiment, one may wish to add to the state space the following types of learning styles: visual, auditory and tactile/kinesthetic preference level. For example, visual, auditory and tactile/kinesthetic preference levels may be considered as a discrete value categories from 1 to 5. |
| 8 | $\alpha_8(U^u) \in \{1, 2, \ldots 5\}$<br>Auditory Preference Level | |
| 9 | $\alpha_9(U^R) \in \{1, 2, \ldots 5\}$<br>Tactile/Kinesthetic Preference Level | |
| τ | $\alpha_\tau(U^u, c) \in \{Yes, No\}$<br>User Type | Type: In an embodiment, one may wish to assign users into one or more type category:<br>c   Type Category<br>1   student-user or "student" or "learner",<br>2   instructor-user or "instructor",<br>3   author-user or "author"<br>4   guest-user or "guest"<br>5   consumer-user or "consumer"<br>6   proctor-user or "proctor" |

Resource Generation Request Object

Through interaction with the learning system, a user may request the system to produce a learning tool with specific characteristics. The request may take the form of a distribution of desired characteristics of a learning tool. After the request for a distribution of desired characteristics is received by a database, a subset of the learning tools in the database having a plurality of characteristics satisfying the requested distribution of desired characteristics is generated. The request may be coded within the system as a request object.

In general, a user may create a request object via a command line or graphical interface or upload a request object file. A resource generation request object describes the characteristics of the user's ideal resource.

In another embodiment, the system itself may create these request objects based on some action strategy (see section ACTION STRATEGY below). For example, if a student shows deficiency in certain subject matter areas, the system may generate a request for remedial learning tools to be generated for the user. The system may create these request objects based on estimates of the characteristics of a user. For example, a learning tool may be generated based on an updated conditional estimate of a user signal representing a characteristic of the user and a characteristic of a learning tool. This estimation process is described in more detail in the section ESTIMATION PROBLEM. Once the subset of the plurality of learning tools is generated, it may be transmitted to at least one user, such as a student who requested a learning tool.

The system stores characteristics of a request object corresponding to the characteristics of learning tools stored in the system. Characteristics of a request object may include one or more of the following characteristics: the learning objective, the learning style, the difficulty, the effectiveness, the motivation rating, the popularity, the format availability, the time and the type of the request object. Additional characteristics of request objects such as locked objects and black-listed objects may also be recorded. A locked request object is a request object which specifies a fixed learning tool to be generated each time a particular set of learning tools is generated. For example, if a high-stakes examination is requested, then the teacher-user may desire certain questions within the examination to be the same for each student that writes the examination. In the context of an assessment that is not high-stakes, a professor may wish to generate subsets of the plurality of learning tools for each of the plurality of tools that are unique, for example, to gather data about questions to be asked in future courses or in order to prevent cheating. If the teacher-user dislikes questions within the system, the teacher-user may blacklist a question in order that it does not appear on any examination produced for the students within that teacher-user's course. This type of locking and blacklisting may be performed for any of the types of request objects.

The requested learning tool type may correspond to any type of learning tool within the system, including eBooks, audible lectures, interactive lectures, training sessions, virtual tutoring, homework assignments, full solution to assessment items, lecture notes, algorithmic/templated questions or exercises, accessible for visually impaired (for example, with WAI-ARIA 1.0 standards for screen readers), courseware, Learning Objective Map or Course Blueprints, Questions, Homework assignments, Exams, lab work, eWorksheets, algorithmic/template, SmartPlot Questions include graphics.

Templated questions are questions in which the parameters within the question may be stored as variables. For example, in a reading question, a single passage may include a character whose name is randomly generated for each examination and the answer key will also be updated with the same name. This may reduce cheating because the answer to a question such as "who is the main character?" may result in a different correct answer for each test, even though the knowledge being tested is the same. This principle can be used in mathematics where terms may be randomly generated with resulting solutions that test the underlying understanding of the user but may appear on its surface, thereby reducing the potential for cheating. Templated questions may be treated as having the same characteristics, since the variables within the question should not change the type or difficulty of the question.

The objects may be requested by different users. As described in the example of a teacher-user requesting an examination, teacher-users may generate assessment items. Similarly, a teacher-user may request a complete coursepack based on a set of requirements determined through selection.

A student-user may also generate learning tools through a request object, such as practice problems or lectures to assist with learning. The system may automatically generate learning tools based on a conditional estimate of the user's characteristics such as proficiency or learning style. For example, if a user is poor in a subject area such as fractions, then the system may generate practice problems that include a higher distribution of fractions than other subject areas where the user may be more proficient. Similarly, the practice problems may be easier for areas where the user is deficient. This adaptivity allows content to be generated to suit the particular student's needs.

Once requested, a learning tool which conforms to the request object may be sent to one or more users. The user may be the student who requested the request object, or various requested learning tools satisfying the desired characteristics may be sent to the students studying in a particular course. The learning tools may be sent to the users in a variety of ways, such as displaying the generated objects on a user's computer screen, sending the generated objects to a user's email address or internal system messaging system or otherwise transferring the generated learning tools to the user.

Depending on the situation, the requested learning tools may be generated at the time they are requested or at some future time. For example, examination questions may be pre-generated by a professor who wishes to vet all question before distributing the exam to his students. At other times, examination questions may be generated simultaneously with an event, for example, where the student-user begins an examination. In some cases, the individual questions within a generated examination may be generated as the examination proceeds.

Also, each of the desired characteristics of a learning tool may be set by a user or anticipated by the system to adapt to the characteristics of the user. Some characteristics may be user selected while others may be automatically chosen by the system. For example, a student may desire the system to generate remedial learning tools that will optimally improve that particular student's proficiency in a subject area. The student-user may select a time limit, for the learning tool and ask the system to generate other parameters based on the particular user's characteristics. In another example, a professor-user may fix many of the desired characteristics for a high-stakes examination to ensure fairness. In some cases, a pre-existing subset of a plurality of learning tools, such as a chapter in a textbook may satisfy the distribution of desired characteristics of a learning tool, and in those circumstances, the learning tool may be re-published in an unchanged form.

We denote a request object by $RQ^{rq} \in \{RQ^j\}_{j=1}^{|RQ|}$ where $1 \leq rq \leq |RQ|$. In an embodiment, each resource generation request $RQ^{rq}$ may have one or more of the following of fields described in Table 4. The characteristics of a request object will mirror the characteristics of a learning tool. Some features, such as locked and black-listed items do not have corresponding characteristics for learning tools, as these features act to specifically exclude or include specific learning tools or classes of learning tools.

TABLE 4

| j | Symbol | Description of field j for $RQ^{rq}$ |
|---|--------|--------------------------------------|
| 0 | $\alpha_0(RQ^{rq}, k) \in \{RQ^j\}_{j=1}^{|\alpha_1(RQ^{rq})|}$<br>Request Segments | Recursive Structure: In an embodiment, we recursively define a request object as an ordered sequence of other request objects. The base atom or smallest indivisible request is a request with at least one of the following conditions:<br>1. $\alpha_9(RQ^{rq}, 1) = \text{MIN}(\{\alpha_9(R^j)\}_{j=1}^{|R|})$, and<br>2. $\alpha_{10}(RQ^{rq}) = 1$. |
| 1 | $\alpha_1(RQ^{rq}, m, a) \in [0, 1]$<br>such that<br>$$\sum_{m=1}^{|L|} \sum_{d=0}^{6} \alpha_1(RQ^{rq}, m, a) = 1.$$<br>LO Difficulty Distribution | Ideal Learning Objectives: user's ideal distribution over LO-difficulty composition of the resource.<br>In an embodiment, an ideal distribution over LO and difficulty may be described separately.<br>i.e. $\alpha_{1a}(RQ^{rq}, m) \in [0,1]$, such that<br>$$\sum_{m=1}^{|L|} \alpha_{1a}(RQ^{rq}, m) = 1 \text{ and}$$<br>$\alpha_{1b}(RQ^{rq}, d) \in [0, 1]$ such that<br>$$\sum_{d=0}^{6} \alpha_{1b}(RQ^{rq}, d) = 1.$$<br>We can then set<br>$\alpha_1(RQ^{rq}, m, d) = \alpha_{1a}(RQ^{rq}, m)\alpha_{1b}(RQ^{rq}, d)$.<br>In another embodiment, the user may set an ideal distribution unnormalized by describing a weight.<br>In another embodiment, the user may set an ideal distribution over a learning objective grouping LOG with each distribution unnormalized by describing a weight.<br>In a further embodiment, each LOG may have uniform weight incrementes to add uniformly unnormalized weight based on a button/key clicks/press for all learning objectives in a particular LOG.<br>In a further embodiment, uniform weight is incremented based on elapsed time passed from initial button/key click/press and release.<br>In a further embodiment, the system may provide the user with a graphical representation of the distribution, in the form of a histogram which is updated in real-time as the user makes changes to the distribution weights.<br>In a further embodiment, user may updated the histogram itself on difficulty or LO. |
| 2 | $\alpha_2(RQ^{rq}, m, a) \in [0, 1]$<br>such that<br>$$\sum_{m=1}^{|L|} \sum_{a=0}^{10} \alpha_2(RQ^{rq}, m, a) = 1.$$<br>Ideal Quality Distribution | Ideal Quality: In an embodiment, we may want to allow the user to set an ideal distribution over LO quality level.<br>This may especially be desirable in high-stakes exam environments.<br>In an embodiment, the user may describe an overall quality distribution over all LO (i.e. not for each LO).<br>In an embodiment, the user may describe a minimum acceptance for expected quality level. |
| 3 | $\alpha_3(RQ^{rq}, a) \in [0, 1]$<br>such that<br>$$\sum_{a=0}^{10} \alpha_3(RQ^{rq}, a) = 1.$$<br>Teaching Quality Level Distribution | Ideal Overall Teaching Quality: In an embodiment, the user may set an ideal distribution over teaching quality level.<br>In an embodiment, the user may describe a minimum acceptance for expected quality level. |

TABLE 4-continued

| j | Symbol | Description of field j for $RQ^{rq}$ |
|---|---|---|
| 4 | $a_4(RQ^{rq}, a) \in [0, 1]$ such that $\sum_{a=0}^{10} \alpha_4(RQ^{rq}, a) = 1.$ Communication Quality Level Distribution | Ideal Overall Communication Quality: In an embodiment, the user may set an ideal distribution over communication quality level. In an embodiment, the user may describe a minimum acceptance for expected quality level. |
| 5 | $\alpha_5(RQ^{rq}, a) \in [0, 1]$ such that $\sum_{a=-3}^{3} \alpha_5(RQ^{rq}, a) = 1.$ Motivation Distribution | Ideal Extrinsic Motivation: In an embodiment, the user may set an ideal distribution over extrinsic motivation rating level. In an embodiment, the user may describe a minimum acceptance for expected level. |
| 6 | $\alpha_6(RQ^{rq}, a) \in [0, 1]$ such that $\sum_{a=0}^{10} \alpha_6(RQ^{rq}, a) = 1.$ Popularity Distribution | Ideal Popularity Rating: In an embodiment, the user may set an ideal distribution over popularity rating level. In an embodiment, user may describe a minimum acceptance for expected level. |
| 7 | $\alpha_7(RQ^{rq}, a) \in [0, 1]$ such that $\alpha_7(RQ^{rq}, a = Yes) + \alpha_7(RQ^{rq}, a = No) = 1.$ Visual Preference Distribution | Ideal Learning Style: In an embodiment, the user may set an ideal distribution over the presence of one or more of three learning style preferences. |
| 8 | $\alpha_8(RQ^{rq}, a) \in [0, 1]$ such that $\alpha_8(RQ^{rq}, a = Yes) + \alpha_8(RQ^{rq}, a = No) = 1.$ Auditory Preference Distribution | |
| 9 | $\alpha_9(RQ^{rq}, a) \in [0, 1]$ such that $\alpha_9(RQ^{rq}, a = Yes) + \alpha_9(RQ^{rq}, a = No) = 1.$ Tactile/Kinesthetic(Preference Distribution | |
| 10 | $\alpha_{10}(RQ^{rq}, a) \in [0, 1]$ such that $\sum_{a=0}^{TT} \alpha_{10}(RQ^{rq}, a) = 1$ Ideal Total Time Distribution | Ideal Total Time: In an embodiment, the user may set an ideal total time. |
| 11 | $\alpha_{11}(RQ^{rq}, a) \in [0, 1]$ such that $\sum_{a=0}^{NN} \alpha_{11}(RQ^{rq}, a) = 1,$ where NN is set to a large enough number (e.g. 10,000). Number of Segments Distribution | Number of Segments: In an embodiment, the user may set an ideal number of requests. |
| 12 | $\alpha_{12}(RQ^{rq}) \in \{U^j\}_{j=1}^{|U|}$ Assignment | Assignment: Assigns student groups to which this resource request object is published, shared or linked. |
| 13 | $\alpha_{13}(RQ^{rq}, k) \in \mathbb{R},$ where $0 \leq k \leq |\alpha_0(RQ^{rq})|.$ Ideal Posting Schedule | Ideal Posting Schedule: the user may set his/her ideal posting time $\alpha_{13}(R^r, k)$ for user or user group $\alpha_{12}(RQ^{rq})$ and for the kth request segment. In another embodiment, the system may store, in addition or in lieu of date/time, the offsets from segment k − 1's start time. |

TABLE 4-continued

| j | Symbol | Description of field j for $RQ^{rq}$ |
|---|---|---|
| 14 | $\alpha_{14}(RQ^{rq}, k) \in \mathbb{R}$, where $0 \leq k \leq |\alpha_0(RQ^{rq})|$. Due Date & Time | In an embodiment, the user may be given the flexibility to described time offets from segment k − 1's end time. Ideal Due Date & Time: the user may set his/her ideal due date & time $\alpha_{14}(R^r, k)$ for user or user group $\alpha_{12}(RQ^{rq})$ and for the kth request segment. In another embodiment, the system may store, in addition or in lieu of date/time, the offsets from segment k − 1's start time. In an embodiment, the user may be given the flexibility to described time offets from segment k − 1's end time. |
| 15 | $\alpha_{15}(RQ^{rq}) \in \mathbb{R}$ Ideal Average Workload | Ideal Average Workload: In an embodiment, the user may describe the ideal average workload measured. |
| 16 | $\alpha_{16}(RQ^{rq}) \in \mathbb{R}$ Ideal Average Learning Rate: | Average Learning Rate: In an embodiment, the user may describe the ideal average learning rate measured. Course Pace: In an embodiment, the system can report on metrics such as the course pace or even chart the change in course pace from week to week, topic to topic. |
| 17 | $\alpha_{17}(RQ^{rq}; k) \in \mathbb{R}$ Posting Schedule Tolerance: | Posting Schedule Tolerance: In an embodiment, the user may set an allowable tolerance level for scheduling resources posting, where $\alpha_{17}(RQ^{rq}, k) = 0$ means that the kth request segment will be scheduled on $\alpha_{17}(RQ^{rq}, k)$. In another embodiment, we further reserve $\alpha_{17}(RQ^{rq}, k) = -1$ to mean that the kth request segment will be posted after or at the same time as the (k − 1)th segment. |
| 18 | $\alpha_{18}(RQ^{rq}, k) \in \mathbb{R}$ Due Date & Time Tolerance | Due Date & Time Tolerance: In an embodiment, the user may set an allowable tolerance level for scheduling due dates, where $\alpha_{18}(RQ^{rq}, k) = 0$ means that the kth request segment will be due on $\alpha_{18}(RQ^{rq}, k)$. In another embodiment, we further reserve $\alpha_{18}(RQ^{rq}, k) = -1$ to mean that the kth request segment will be due after or at the same time as the (k − 1)th segment. |
| 19 | $\alpha_{19}(RQ^{rq}) \in \mathbb{R}$ Workload Tolerance | Workload Tolerance: In an embodiment, the user may set an allowable workload tolerance level when scheduling resources. |
| LK | $\alpha_{LK}(RQ^{rq}, k) \in \{Yes, No\}$ | Locked Resource(s): In an embodiment, the user may lock into a resource slot. |
| BL | $\alpha_{BL}(RQ^{rq}, j) \in \{Yes, No\}$ where $1 \leq j \leq |R|$. | BlackListed Resource(s): In an embodiment, the user may blacklist certain resources for any slot k. Yes indicates that resource $R^j$ will not be included in this any of slot k where $1 \leq k \leq |\alpha_1(RQ^{rq})|$. |
| $\tau$ | $\alpha_\tau(RQ^{rq}, c) \in [0, 1]$ such that $$\sum_{c=1}^{20} \alpha_\tau(RQ^{rq}, c) = 1$$ | Resource Type/Format Distribution: In an embodiment, users may request format using distribution over a subset of type and format such as one or more of the format types described in the chart below. |

| Resource Type Distribution | c | Type Category |
|---|---|---|
| | 1 | Question |
| | 2 | Learning |
| | 3 | lab question |
| | 4 | eWorksheet |
| | 5 | algorithmic/template |
| | 6 | accessible for visually impaired (WAI-ARIA 1.0 standards for screen readers). |
| | 7 | Interactive/educational games |
| | 8 | eBook |
| | 9 | eLecture |
| | 10 | interactive |
| | 11 | training session |
| | 12 | virtual tutoring |
| | 13 | Homework |

TABLE 4-continued

| j | Symbol | Description of field j for $RQ^{rq}$ |
|---|---|---|
| | | 14 full solution |
| | | 15 lecture notes |
| | | 16 algorithmic/template |
| | | 17 accessible for visually impaired (WAI-ARIA 1.0 standards for screen readers). |
| | | 18 Courseware: (defined below) |
| | | 19 Course Template: (defined below) |

Courseware or Study Plan Template

In an embodiment, we define a course template as a scheduled resource generation request object $RQ^{rq}$ with the following properties for its attributes:

1. $\alpha_{11}(RQ^{rq}) > 1$ or $\alpha_{11}(RQ^{rq}) = NULL$ (typically $\alpha_{11}(RQ^{rq}) > 50$),
2. there exists a k, where $1 \leq k \leq \alpha_{11}(RQ^{rq})$ such that $\alpha_\tau(\alpha_0(RQ^{rq}, k), 1) = 0$ i.e. there exist at least one segment where there is no chance of it being a question, which in turns means this is NOT an assessment, and
3. there exists a j, k, where $1 \leq j$, $k \leq \alpha_{11}(RQ^{rq})$, and c, d, where $1 \leq c < d \leq 20$ such that $\alpha_\tau(\alpha_0(RQ^{rq}, j), c) = \alpha_\tau(\alpha_0(RQ^{rq}, k), d) = 1$ i.e. there exist at least two segments with different types.

Typically a study plan is on a smaller time scale and course template on a larger time scale.

Another commonly used term is Learning Objective Maps or Course Blueprinting. Entire textbooks or courseware can be generated due to the flexibility of both the resource and resource request models and the system's utilization of the power of non-linear filtering to estimate the most hidden user and resource attributes (see ESTIMATION PROBLEM and ACTION STRATEGY section below).

In one preferred embodiment, courseware may be customized to an institution's course blueprint. A user may create a course blueprint via command line interface, file upload or graphical interface. Courseware may be produced as follows:

1. create container object $RQ^{rq}$,
2. define the set of learning objectives along with the starting and ending proficiency by creating another resource generation request object $RQ^{rq}$ and storing them into a segment k in container object $RQ^{rq}$. Note: each segment represents one learning objective.
3. set ideal total time for each segment. This is a measure of the amount of time you want a student to "learn" the associated learning objective,
4. for each segment, the user can set Ideal Posting Schedule $\alpha_{13}(RQ^{rq}, k) \in \mathbb{R}$, $\alpha_{14}(RQ^{rq}, k) \in \mathbb{R}$ Due Date & Time, $\alpha_{17}(RQ^{rq}, k) \in \mathbb{R}$ Posting Schedule Tolerance, $\alpha_{18}(RQ^{rq}, k) \in \mathbb{R}$ Due Date & Time Tolerance. The posting schedule may be thought as the start of the learning objective and due date as the end.
5. set $\alpha_{15}(R^r) \in \mathbb{R}$ Ideal Average Workload, and $\alpha_{19}(RQ^{rq}) \in \mathbb{R}$ Workload Tolerance
6. set any other distributions such as formats, locked resources, blacklisting resources
7. set $\epsilon = 0 = \delta$ in the system's resource generation tool and click on generate.
8. the system returns a customized courseware pack in the format requested through course-blueprint modeled.
9. after years of refinement through feedback and research, one may wish to publish a refined learning objective ordering and construct new learning objective dependencies (pre-requisite, co-requisites) by setting the posting and due date attributes for each segment,
10. in another embodiment, one may wish to sell or publish a highly refined course blueprint or do further analysis on the refined blueprint to determine what properties of the blueprint make it successful.

System Traffic Session

In general the system traffic is a hierarchal model where at the top level we describe user consumption or interaction of resources using the system tools and the lowest level the description is that at the level of the network (i.e. TCP/IP connection session). In this description we focus our attention to the higher levels of session traffic and define system traffic session object as $S^s \in \{S^j\}_{j=1}^{|S|}$.

TABLE 5

| j | Symbol | Description of field j for $S^s$ |
|---|---|---|
| 0 | $\alpha_0(S^s, k) \in \{S^j\}_{j=1}^{|S|}$<br>Recursive Structure | Recursive Structure: In an embodiment, a session may be recursively defined as an ordered sequence of other sessions. The base atom or smallest indivisible unit is a TCP/IP network session.<br>It is intended that the sessions are sorted according to the session starting time i.e. $\alpha_{start}(S^s, 1) < \alpha_{start}(S^s, 2) < \alpha_{start}(S^s, 3)$ and so forth. |
| 1 | $\alpha_1(S^s) \in \{U^j\}_{j=1}^{|U|}$<br>User Reference | User Object Reference: |
| 2 | $\alpha_2(S^s) \in$ System Feature/Tool Set<br>System Tool | System Tool: In an embodiment, the system may store which system tool the users participating in this session have direct access to.<br>For example: $\alpha_2(S^s) = $ eBook_reader and $\alpha_1(S^s] = U^{45}$ means user with id 45 is has direct access to (on screen) to the system's eBook reader tool. |

TABLE 5-continued

| j | Symbol | Description of field j for $S^s$ |
|---|--------|----------------------------------|
| 3 | $\alpha_3(S^s) \in \{R^j\}_{j=1}^{|R|}$<br>Session Resource | Session Resource: In an embodiment, the system may store which resource the users participating in this session have direct access to or have loaded through using system tool $\alpha_2(S^s)$. |
| 4 | $\alpha_4(S^s) \in \{$Learning, Answering, Authoring$\}$<br>User Consumption Activity Type | User Consumption Activity: In an embodiment, user activity type may be represented. |
| 5 | $\alpha_5(S^s) \in [0, 1]$<br>Return and Response Code | System Return and Response: In an embodiment, return or response code for tool $\alpha_2(S^s)$ may be represented. Setting $\alpha_5(S^s) \neq$ NULL will terminate this session (i.e. set $\alpha_{end}(S^s) \neq$ NULL). |
| start | $\alpha_{start}(S^s) \in \mathbb{R}$<br>Start Time | Start Time of the session. In an embodiment, we define the start time as the time of this session $S^s$ creation. |
| end | $\alpha_{end}(S^s) \in \mathbb{R}$<br>End Time | End Time of the session. In an embodiment, end time is defined as the earlier of:<br>1. setting $\alpha_{end}(S^s) \neq$ NULL, and<br>2. inactivity timeout (i.e. lacking a termination acknowledgement of a session due to the nature of the web). |

Fitness Functions

In order to generate one or more learning tools which satisfy a plurality of characteristics of a requested distribution of desired characteristics a fitness function may be used to compare the characteristics of the requested learning tool with the distribution of desired characteristics. In an embodiment, the fitness function is defined between the system's estimate of the resource characteristics denoted $\alpha_F(R^r)$ for resource $R^r$ and a resource generation request $RQ^{rq}$.

In general, the fitness function quantifies attribute by attribute the difference (or equivalently divergence) between $\alpha_F(R^r)$ and $RQ^{rq}$. For clarity, the smaller the score the "closer" $\alpha_F(R^r)$ is to $RQ^{rq}$.

We relabel $x=\alpha_F(R^r)$ is to $y=RQ^{rq}$ and define a recursive fitness function for all resource segments.

$$\Phi(x, y) = \sum_{k=0}^{K} \gamma^k \Phi[\alpha_0(x, k), \alpha_0(y, k))], \text{ if } K > 1, \text{ and}$$

$$\Phi(x, y) = \phi(x, y), \text{ otherwise,}$$

where $\gamma^k \geq 0$ is the weight for segment k and k=0 represents the overall top container level object.

These weights if zero nullify the corresponding subscore for segment k and if $\gamma^k > 0$ serves as an importance or scaling factor.

In an embodiment, we further describe $\phi$ by following:

$\phi(x, y) = \Sigma_i \delta^i \phi^i(x, y)$ where $\delta^i$ is an importance or scaling weight for attribute i.

In an embodiment, we use, for attributes $1 \leq i \leq 11$ and $i = \tau$, a variant of the Kullback-Leibler divergence to measure difference between distributions x and y, $$\phi^i(x, y) = \sum_j \phi^i(x, y, j)$$

and $$\phi^i(x, y, j) = \begin{cases} \alpha_i(x, j) \times \log\left(\frac{\alpha_i(x, j)}{\alpha_i(y, j) \vee 0.001}\right), & \text{if } \alpha_i(x, j) \neq 0 \\ \phi_i, & \text{otherwise.} \end{cases}$$

In another embodiment, other measures can be used such as the Itakura-Saito distance.

In an embodiment, we further describe the comparison between two scheduled resource generation request objects x, $y \in \{RQ^j\}_{j=1}^{|\alpha_1(RQ^{rq})|}$. In this case, for attributes $13 \leq i \leq 19$ we add to the overall weighted summation in [0098]

$$\phi^i(x,y) = |\alpha_i(x) - \alpha_i(y)|.$$

In an embodiment, we can present a method for a user to compare fitness of two course templates and any resource. For example: if one wishes to answer the following, "How close does this eBook follow my course blueprint/template?" the fitness function along with the systems filter estimates can answer such questions.

In an embodiment, one can further compare exams to a course outline (a course template without scheduling), compare any two resources such as a series of homework questions and an eBook reading schedule.

In determining the similarity between a requested learning tool and the learning generated by the learning system, the fitness function may place a higher emphasis on features such as fit or fairness. Fairness may measure similarity in difficulty between two or more generated examinations. For high stakes examinations, the system should place heavy weight on fairness so that each student is evaluated on the basis of exams of the same difficulty. In other situations, such as when the system may generate educations items such as eBooks, it is more important for all topic areas to be covered, and so there may be stronger weight on fit to ensure there are no topics are unrepresented. The scoring function may be used to encourage spread and encourage expected results, for example, by penalizing for a particular characteristic zero values in $\alpha_F(R^r)$ for a candidate resource $R^r$ when $RQ^{rq}$ defined ideals with non-zero weight on the same characteristic.

Resource Generation
Resource Generation Object

The system and method allow the creation, auto-generating, representation and delivery of at least one of the following:
- an arbitrary number of assessments,
- an arbitrary number of homework assignments,
- a entire coursepack randomly generated based on a course template,
- an arbitrary number of remedial study plans,
- a lecture series customized to complement an instructors course schedule, etc . . .

In an embodiment, one may randomly generate a set of assessment item (i.e. exams, homework, quizzes, labs, etc . . . ) each, unique with controllable features on difficulty and length "equivalence" definable user inputs describing his/her ideal set of assessment.

For example: an instructor may request a weekly homework to be auto-generated with 10 question slots randomly generated with a specified LO distribution taken from the current week's lecture notes and eBook readings, with difficulty level 3 on average and total assessment length 90 mins.

Constraint Solving Problem

In an embodiment, the system allows users to define his/her ideal characteristics of the end result by creation of a resource generation request object $RQ^{rq}$ and requesting to the system to generate N unique segment assignment for $R^r$, where $1 \le r \le N$ such that:

$$\epsilon \le \Phi(RQ^{rq}, R^r) \le \epsilon + \delta,$$

where $N \in [1, \overline{N}]$, $\overline{N}$ is the theoretical maximum or total number of solutions to the problem, $1 \le n \le N$, $\epsilon \ge 0$ is an acceptance threshold parameter for closeness (i.e. good enough fit vs. optimal or best fit parameters as $\epsilon \to 0$), and $\delta \ge 0$ is a threshold parameter for controlling the degree of fairness between any two assessments or acts as a threshold acceptance parameter for closeness when $\epsilon = 0$ and $\delta > 0$.

Resource Generation Process Overview

In an embodiment:
1. a user creates a resource generation request object using the system's resource generation graphical interface (GUI) to create a resource generation request object,
   - In another embodiment, set of parameters can be provided to the system from the user via command line.
   - In another embodiment, the user uploads a parameter file with all the information needed to create a resource generation request object.
   - In another embodiment, system creates the resource generation request object based on other information provided by the system's filter (see SECTION ACTION STRATEGIES).
   - In one preferred embodiment, before any system action is performed, the system pre-filters all zero weighted resources from the database by creating a database view to excluded such resources from resource pool $R^r \in \{R^j\}_{j=1}^{|R|}$ thereby reducing the total resource pool size (i.e. the search space).
     These include the $\alpha_{BL}(RQ^{rq}, j) = Yes$ (Blacklisted items) and resources that have non zero weight.
2. A user may want to set the following parameters $\epsilon$, $\delta$ (optional).
3. In an embodiment, the system we solve this by a process of solving for one assignment at a time in an iterative manner. The iterative process goes as follows:
   1. Initialize counter n=1.
   2. While n<N do the following:
      a. Solve for $R^r$ such that $\epsilon \le \Phi(RQ^{rq}, R^r) \le \epsilon + \delta$ (see next section for an example embodiment).
      b. Increment counter n=n+1.
4. In another embodiment the option is given to the user to allow adjustments of $\epsilon$, $\delta$ and/or user's "ideal" characterization of $RQ^{rq}$.
5. In an embodiment, the system uses a clustering algorithm such as the QT clustering algorithm for suggestions of $\epsilon$, $\delta$ changes.
6. In an embodiment, the clustering along with all the sample points are graphically displayed to the user for clarity.
7. In an embodiment, random algorithms are further used to solve the reverse question on what changes $RQ^{rq}$ are needed to satisfy newly suggested $\epsilon$, $\delta$. A different filter can be used to answer this question, but other random algorithms such as Monte Carlo methods can also be used.

Genetic Algorithms

In an embodiment, we utilize a random algorithm as a method for finding one such assignment.

For example: One such random algorithm is a genetic algorithm comprising a preparation phase, then an assignment initialization phase, and then followed by iterations of a series of steps, each iteration comprising the following steps (the selection and reproduction phase):
- Exit-Evaluation, wherein the population of chromosomes are sorted in increasing order of their scores,
- Elitism, wherein an elitism parameter specifies the number of chromosomes we want to keep in the new population from the current population,
- Cross Over, wherein for each remaining chromosomes that are not kept in the new population pick two existing chromosomes randomly as parents and randomly select a cross-over point and generate a new chromosome,
- Exit-Evaluation, wherein the new population is set as the current population sorted in increasing order of their scores, and
- Mutation, wherein new chromosomes are generated based on a mutation chance, until a termination criteria defined by the condition where the total number of selection and reproduction phase iterations exceeds threshold Z.

Estimation Problem

The following section is broken into several parts. In the first part, some background discussion of the relevant non-linear filter theory and the overall estimation process is provided. In the second part, three signal and observation model pairs, the architecture and model classes are discussed.

Filtering Background

Simply put, the problem is to estimate some object (herein called the signal) given a series of distorted, corrupted, partial data observed information concerning the signal (herein called the observation). The signal has some state that contains all the pertinent information that one wishes to know.

For example, in order to provide student learning resources (e.g. remedial homework, readings, lectures, problem sets, forums, tutoring/review sessions, etc . . . ), the learner's strengths and root deficiencies and learning style (e.g. visual vs. auditory vs. kinesthetic/tactile) would be examples of what could be contained within the signal state.

The change of the learner's state over time (or the learner's state's evolution) typically contains some sort of random dynamics. This randomness is usually included in the model to handle the uncertainty concerning what development (observable or not) might occur next, due to imperfect knowledge.

For instance, the development of a learner's knowledge and skills currently taking place is not exactly known, and thus the change in the state of the signal may be modeled with the appropriate randomness involved.

Within an eLearning/eAssessment/ePublishing/eTutoring ("Platform") environment, various types of traffic data generated from a learner interacting with the Platform can be observed ("observation"). This Platform traffic data can be used in an attempt to observe and/or infer the state of the signal; however such traffic generated can only give probabilistic information of the signal's state since the information is partial and distorted by some sort of noise (e.g. a leaner guessing on a multiple choice question).

In order for a filter to be able to handle these types of problems, a coupled mathematical model of the signal and observation is required. The mathematical model for the signal captures the key dynamics that govern the evolution of the signal state (e.g. the evolution of the signal state in the positive direction (i.e. knowledge acquisition) for a given learning objective can be seen as the activity of learning). The observation needs to be modeled in terms of a sensor function for a given observation (i.e. what information the traffic data derives from the signal based on its state) as well as the noise that corrupts the data.

Depending on the type of filter to be used, these models (signal and observation pair) must meet certain mathematical conditions. These conditions for today's most advanced filters are fairly general, meaning that nearly every situation of importance can be effectively modeled.

Based on the mathematical model for the signal and observation, a filter will output information based on the probability distribution of the signal state given the sequence of observations taken up until that point (sometimes called the 'back observations'). The probability distribution is usually referred to as the filter's conditional probability, given the back observations (or conditional estimate). Typically the information provided by the filter is the signal state itself, although information which can be derived mathematically from the signal's state can also be presented. The estimate is optimal in the sense that it minimizes the error between the estimate of the signal state and the actual signal state in a least squares sense, given the observation information.

The filter can provide the optimal probability of the signal state being within a certain range, which can be extremely useful in determining the best course of action to take in many circumstances.

For example, if the conditional distribution for a user is highly localized on the "low mastery level" for a particular LO (i.e. proficiency level 1 or 2) and is highly localized on the kinesthetic/tactile learning style (i.e. learns by doing or trial-and-error or problem solving type), then the optimal action strategy may create an individualized remedial solution by compiling for the user a set of interactive practice problems with full detailed solutions with starting with difficulty level 2 and 3.

However, if the conditional distribution is spread out over a larger region of space, then the optimal action strategy may wish to either wait until the next homework or quiz to occur to gain more information or suggest the learner to try out the adaptive assessment feature (described in the next section ACTION STRATEGIES) to help localize on the signal's state.

What can Filtering do?

Figure 9:
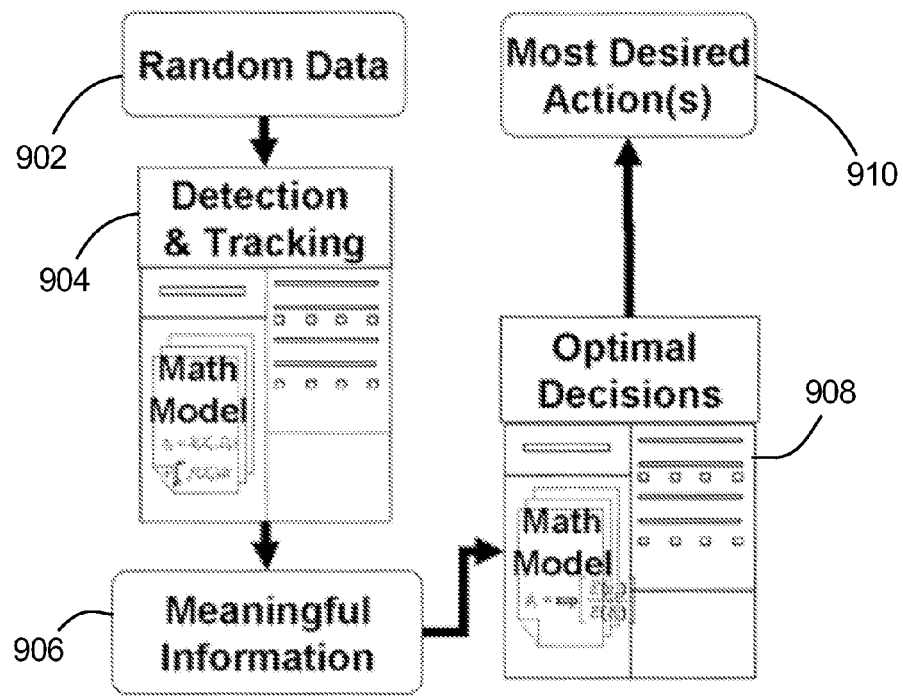
FIG. 9 is a flow chart showing a method of filtering data.

FIG. 9 shows a conceptual drawing showing a method of filtering. Random data is detected at 902. This means extracting meaningful information 904 from random/partial/noisy/corrupt data in real time by detecting and tracking the data at 904 and then performing optimal decisions 908 based on the conditional estimates. Based on the optimal decisions, a most desired action may be put into action at 910. Filtering can essentially perform three main functions: detection, tracking and prediction. Each function is based on the conditional distributions calculated by the filter. A filtering solution typically can perform all of these tasks, although it usually does not need to perform all these tasks at the same point in time. For example, a filter typically detects a signal before it attempts to track it.

Detection involves identifying and characterizing a signal and is typically the initial task that a filter performs (i.e. such as initial (or a priori) knowledge, motivation, intelligence and attitudes).

Once detected, the tracking mode involves estimating the state of a signal and updating it in real time as new observation data arrives. Tracking mode could involve the tracking of a signal's learning. By updating in real-time, the system may conserve system resources, because other methods of tracking data such as data-mining may consume increasingly more data as time increases.

Prediction involves estimating the future state of a signal, given the current conditional distribution of a filter and a course blueprint (i.e. course outline and scheduled learning activities). Prediction is very useful in many areas, such as giving early feedback to instructors or course administrator before it is too late (i.e. the final exam).

In general, we want to optimally estimate both the user's characteristics and resource characteristics. Herein we describe the signal/observation model pair.

Signal Model

Signal State and Parameter Estimation

In general, the signal is composed of users, resources and parameters that govern both user and resource signal dynamics. The signal may represent characteristics of the user and characteristics of the learning tools.

In an embodiment, the signal of a user is modeled as a collection of characteristics representing a learner's level of LO proficiency (mastery), interpersonal skills (e.g. teaching quality), motivation, learning style & learning type preference, overall participation, work ethic, attitude, personality and any parameters that need to be estimated to evolve the signal (SEE USER OBJECT above). The signal of a resource is modeled as a collection of characteristics representing a resource object or learning tool. Note that the learning tool can be either an educational item or an assessment item (SEE RESOURCE OBJECT above).

Typically, the signal state is evolved by internally driven dynamics.

In an embodiment, the signal state of a user is further evolved by external session events. For example a leaner-user consuming and interacting with a section of eBook resource surely has some effect (typically positive) to his/her proficiency for the LOs covered in the section. These external session events may drive the user behavior. User behavior is data collected about a user that is not the answers to questions (i.e. question item response) or other assessment items. Observations of user behavior may be obtained through user interaction with the computerized learning system.

Another example: a user taking an exam creates session objects other than just the submission of his or her answers. In an embodiment, the system evolves the state of the user and resource by external session events generated during an assessment (e.g. traffic generated during exam (or any assessment) that is not just the answers to questions presented).

Below we first describe the signal dynamics of a user then followed by a description of the resource signal dynamics.

Signal Evolution for User Characteristics

Signal evolution describes the dynamics which may be inherent to the signal (e.g. in the negative direction (knowledge degradation) in the case of long periods of inactivity), or it may come from external influences directly observed by the learning tools consumption traffic (e.g. in the positive direction i.e. "learning" or "acquiring knowledge or LO competency" when an user watches an online lecture, participates in a blog about a homework assignment question, joins a virtual tutoring session, or simply is reading and annotating an eBook).

We first describe the internally driven signal dynamics:

Markov Chain model: In preferred embodiment, we may wish to artificially add randomness. For example: one way of doing this is to use a Markov Chain model and describe transition probabilities for going from level j+1 to j for attribute $\alpha_i$ and in the reverse direction. For example: in the case of proficiency we can define the probabilities:

$$P[\alpha_1(X,m)_{t_k}=j|\alpha_1(X,m)_{t_{k-1}}=j+1]=p^+, \text{ and}$$

$$P[\alpha_1(X,m)_{t_k}=j+1|\alpha_1(X,m)_{t_{k-1}}=j]=p^-$$

for each LO $1 \leq m \leq |L|$ and $j \in \{0, 1, \ldots, 6\}$. Further we may wish to have $p^+$ and $p^-$ depend on j. An example of where this may be useful is to differentiate randomness in lower levels of proficiency j=0, 1, 2 or 3 as compared to the higher levels where j=4, 5 or 6.

Proficiency (Knowledge) and Intrinsic Motivation Degradation: In another embodiment, we may wish to add to the model the degradation of proficiency and motivation (i.e. $\alpha_1(X, m)$ and $\alpha_6(X)$) by $$P[\alpha_1(X,m)_{t_k}=j+1|\alpha_1(X,m)_{t_{k-1}}=j] \text{ and } P[\alpha_6(X)_{t_k}=j+1|\alpha_6(X)_{t_{k-1}}=j].$$

Continuous-time Markov Chain: In another embodiment, we may wish to model the state transitions using Continuous-time Markov Chain (or Semi-Markov Chain) model. For example:

$$P[\alpha_1(X, m)_{t_k} = j + n \mid \alpha_1(X, m)_{t_{k-1}} = j] = \frac{\exp(-\lambda \Delta t)(\lambda \Delta t)^n}{n!},$$

where $\Delta t = t_k - t_{k-1}$.

It is often thought that soft skills are too subtle and complex to be captured or estimated by technology. However, within the system much more information is available. Learning traffic observed may be used to evolve the signal estimate. For example, the user's interaction with education items, such as reading eBooks or watching online lectures may be modeled in the signal model. During assessment sessions, the system may include assessment behavior such as the time to complete a question, the order in which questions are answered or changes made to a response during an examination as data to be used when updating the signal model User Evolution Driven by Learning Activity Session Traffic Learning Activity Sessions driving user evolution: In an embodiment, the system receives a session $S^s$ of type learning activity (i.e. not an assessment) drives the signal state.

We may wish to update the user $\alpha_1(S^s) \in \{U^j\}_{j-1}^{|U|}$ state by the adjusting the appropriate rate parameters $\lambda$ during the learning session duration (ie. $\alpha_{end}(S^s) - \alpha_{start}(S^s)$) base on the session completion level $\alpha_5(S^s)$, and the system's estimates for attributes of the resource consumed $\alpha_3(S^s)$ (i.e. $\alpha_i(\alpha_3(S^s))$).

A conditional estimate of a user signal representing a characteristic of a user may be updated based on these types of learning activity observations through the user evolution model.

User Evolution Driven by Scheduled Future Events

Typical assessment systems are stand alone products therefore do not incorporate a user's long term history (i.e. do not track proficiency, learning, etc . . . ). In fact, students are known to "cram" for a quiz, test or high-stakes exam and such cramming activities are known to store newly acquired temporary knowledge into short term memory. Decay of knowledge from short term memory is typically swift (if without reinforcement).

In an embodiment, one may wish to compensate for this phenomenon by muting the proficiency transitions and the increase rates for short term motivation level.

For example, in an embodiment we decrease rates for proficiency transitions and increase rates in motivation transitions when near a scheduled high-stakes event (e.g. final or midterm exam).

User Evolution Driven by Assessment Session Traffic

A user's state may be driven by external session events generated during an assessment (e.g. traffic generated during exam (or any assessment) that is not just the answers to questions presented). In an embodiment, this may be accomplished by adjusting appropriate transition rates $\lambda$.

For example, in an embodiment, transition rates $\lambda$ for a user's proficiency level may be based on the following user behavior information either available directly from the session object $S^s$ or derived through the analysis of the session segments:

- question jumping timing patterns: of going from one question to another before submitting final answers. For example this may be incorporated by an increase in rates that correspond to $\lambda$ that govern transitions for user proficiency $\alpha_1(U^u, m)$.
- the time taken to answer (i.e. submit answer) after question is presented to user. For example this may be incorporated by an increase in rates that correspond to proficiency/knowledge degradation.
- in the situation where a question is encoded to allow for multiple attempts; the entire attempts history may be incorporated by an increase of rates $\lambda$ that govern transitions for user proficiency $\alpha_1(U^u, m)$ and learning effectiveness $\alpha_2(U^u, m, a, b)$, In particular, the learning objective set representing problem solving should increase and in the event where an answer is correct after several attempts. Of course this works especially well in question items that are machine graded e.g. an expression or numerical type question.
- user's attempts not submitted, i.e. user's answers that are not submitted as final answer may be used to an increase appropriate in rates $\lambda$ that govern transitions for user proficiency $\alpha_1(U^u, m)$.

In an embodiment, one may wish to evaluate more than just proficiency and knowledge of learning objectives; one may wish to add the possibility for direct learning in an assessment. For example after answer is submitted, the system may show to the user the full solution for that answer. This especially works well in one-by-one adaptive assessment (SEE section ACTION STRATEGY below).

In an embodiment, one may wish to have the identity estimated using a filter. This is especially important in a high stakes exam. This may be accomplished by comparing biometric traffic profile trained from low stakes activity of the user's interaction with the system (i.e. "ground" truth) and using a non-linear filter to estimate whether or not a high stakes session activity traffic is more likely generated by a different user or simply just an anomaly (e.g. user's nervousness). In this case, we would need to add to the attributes of a user $U^u$. If the user signal does not correspond to a conditional estimate of the identity of the user, then a report may be generated that includes a notice that the conditional estimate of the identity of the user for a current session does not correspond to a conditional estimate of the identity of the user for a previous session. In this case, a proctor or the course instructor may need to be notified.

TABLE 6

| | | |
|---|---|---|
| $\alpha_{10}(U^u) \in \Phi$ User Biometric Traffic | Biometric Traffic Profile: In an embodiment, one may wish to add to the state space information about the user's biometrics for his/her normal traffic patterns. For example, this may be modeled as a ρ-step covariances matrix for at least one of keystroke and mouse events for each the system's feature/tools ("System Tool/Feature Set") (e.g. system login, scientific rich text editor, answer input, annotation, message, forum . . .). | |

Other External Session Traffic Driving User Evolution

In an embodiment one may with to have other user characteristics evolve based on session traffic. These include (but not limited to):

Teaching Skill Level $\alpha_3(U^u)$ based on the level of observing tutoring traffic between users, Communication Skill Level $\alpha_4(U^u)$ based on frequency and amounts of communication related data in: content and technical support, annotation, forum, messaging, document creation and other similar session traffic that require communication skills, and Intrinsic Motivation $\alpha_6(U^u)$ based on technical support and annotation session traffic.

For Signal Evolution for Resource Characteristics:

Degradation: Since old resources do degenerate in effectiveness, popularity, and motivation levels (i.e. get dated by generational and/or culturally differences over time), in an embodiment, we may want to degrade (slowly) these attributes by increasing the appropriate rates λ.

Resource Evolution Driven by Authoring/Editing Session Traffic

In an embodiment, external session events such as an instructor or author editing a resource may drive resource dynamics (typically in a positive way). For example the effect of a resources editing session traffic may be captured by adjusting appropriate rates λ that govern the resources transitions for at least one of: Proficiency Transition Quality, Teaching Quality Level, Communication Quality Level (English typo and rewording edits) and Extrinsic Motivation Rating.

Resource Evolution Driven by Learning Activity Session Traffic

In an embodiment, external session events such as a student or learner user interacting with a learning resource may drive resource state dynamics. For example the effect of learning activity session traffic to a resources state may be captured in the adjustment of appropriate rates λ that govern a resource's transitions for at least one of: Proficiency Transition Quality, Teaching Quality Level, Communication Quality Level, and Extrinsic Motivation Rating.

For example users interacting with a resource may annotate the resource and publish his/her annotations so that others may benefit. In an embodiment, a user may start a blog, forum thread or simply a "conversation" within the system. For example a user starts a public virtual conversation on a chapter, section or even paragraph of an eBook. Such activities in a sense "evolves" the original eBook in a positive way. The degree of adjustment for of the appropriate rates λ may further be dependent on the authors of such annotations, forum entries or blogs linked to the resource.

Complete Signal Model Description

Although the system and method are described using a single filter applied to both the users and resources, the filter may also be applied to each of the users and resources separately. By applying an independent filter, information contained in the user signal model may be used to estimate the signal model of a resource and information contained in the resource signal model may be used to estimate the user signal model.

By using two separate filters on the resource and signal models, the system may apply a filter on the resource model by extracting data from the application of a historical filter of the user model. That is, by historically smoothing the generated information from the user filter, the system may more accurately estimate information for the resource model. For example, if a student-user answered a question incorrectly at time $t_k$ but the optimal tracker shows that the student was likely to have been at a low proficiency at the time $t_k$ then that additional knowledge may be applied when considering the difficult of the resource. By applying historical smoothing, the system utilizes the maximum amount of data. By using historical smoothing, more accurate signal models may be generated. Historical modeling may be used to determine other characteristics of the user other than simply proficiency, such as, for example, motivation, preferred learning environment and other characteristics.

The system and method may model signals relating both to educational items and assessment items. By estimating characteristics of students, educational items and assessment items, the system and method may not only have better estimates of the student's knowledge and ability, but also information about how a student actually learns and which educational and assessment items are effective. This feedback of both educational items and assessment items allow the system or course administrator (e.g. instructors) to adjust the content of course materials and assessment items either manually or through new definitions of a course blueprint. Course resources and ordering of said resources may vary over time as new teaching tools and assessment tools are shown to improve key characteristics such as motivation and proficiency of a student, but moreover, the system may adapt the course material for the particular needs of individual students.

Complete Signal Model Description

The complete signal with all parameters is composed of the all users (U), resources (R), model parameters (P):

$$X_t = \left[ \begin{pmatrix} U_t^1 \\ U_t^2 \\ \vdots \\ U_t^{|U|} \end{pmatrix}, \begin{pmatrix} R_t^1 \\ R_t^2 \\ \vdots \\ R_t^{|R|} \end{pmatrix}, P \right],$$

where there are a total of |U| users and |R| resources in the system.

In an embodiment, we decouple all users and resources and describe the signal per user and per resource. i.e. $X_t^{U^i}=[U_t^i, P]$ and $X_t^{R^i}=[R_t^j, P]$.

Observation Model Description

The system and method relates to analyzing observations obtained from a measurement device to obtain information about a signal of interest.

Typically, the observation model is comprised of a series of sessions of type answering (i.e. $\alpha_4(S^s)$=Answering).

The assessment session object with $u=\alpha_1(S^s) \in \{U^j\}_{j=1}^{|U|}$, $r=\alpha_3(S^s) \in \{R^j\}_{j=1}^{|R|}$, $\alpha_r(\alpha_3(S^s), 21)=$Yes and $\alpha_r(\alpha_3(S^s), 13)=$Yes means that the session is of type assessment question and user u answering a question correctly (i.e. full marks) at time $t_k$ can be denoted by $Y_{t_k}=\alpha_5(S^s, \text{grade})=1$.

Assessment observation typically "observe" the user's ability or proficiency on a LO which are typically information, facts, concepts, figures, ideas or principles, and highly dependent on memory and recall.

The probability of observing $Y_{t_k}=1$ is based on the state of the signal. Specifically, both the user and resource $u_{t_k}$ and $r_{t_k}$.

In an embodiment, we use the classical question item response function. i.e. given $u_{t_k}$ and $r_{t_k}$, we describe the probability of observing the response $Y_{t_k}=1$ as:

$$P(Y_{t_k}=1 \mid u_{t_k}, r_{t_k}) = \sum_{l=1}^{|L|} \Phi(u_{t_k}, r_{t_k}, l) \times A(r_{t_k}, l)$$

where $$\Phi(u_{t_k}, r_{t_k}, l) = c + \frac{1-c}{1+\exp(-a(\theta-b))}$$

and $$A(r_{t_k}, l) = \frac{\alpha_2(r_{t_k}, l)}{\sum_{j=1}^{|L|} \alpha_2(r_{t_k}, j)}$$

and

User Proficiency Level: $\theta=\alpha_1(u_{t_k}, l)$,
Question Difficulty Level: $b=\alpha_1(r_{t_k}, l)$, and
Resource Quality Level: $c=\alpha_2(r_{t_k}, l)$.

In an embodiment, we include more signal information to use in the question item response observation model. These included the following signal attributes:

Estimated total time for resource and actual time spent: $\alpha_{10}(R^r, i)$ and $\alpha_{end}(S^s)-\alpha_{start}(S^s)$. Illustrative scenario: difference in proficiency of a student answering question in 10 secs. and another student 3 mins. for the same question. In the case for updating the question resource: if a thousand students took over 10 minutes for a question that initially was set to 5 minutes in length.

The Support Session Traffic Observations

Attributes for users and resources can be observed and assessed in both technical and content support session traffic. Although this involves a human element, in one preferred embodiment, the system may allow the support user to adjust at least one of: user or resource attribute estimates based on his/her opinion. The degree of adjustment allowed may be a function of the support user's role and subject matter expertise.

In an embodiment, such adjustment will need to be verified by other roles such as: instructor/teacher or original author.

An example: the system updates the Communication Quality Level of resource and student-user (i.e $\alpha_4(R^r)$ and $\alpha_4(U^u)$) characteristic based on support (technical or content) messages. The system's support staff may make the distinction between the resources being unclear and the student's communication skill weakness. Illustrative scenario: if question is unclear or if student is weak in reading.

Learning Activity Session Traffic Observations

In an embodiment, resource's motivation, popularity and estimated total time attributes may be observed in learning activity sessions. Such observations are modeled using a standard sensor functions with appropriate noise. Similar to the case in the question item response, such sensor function may be dependent on a characteristic of the user involved.

An illustrative example why updating a resource based on user learning session traffic would makes sense: Suppose a particular eBook-chapter-section was assigned to users for reading and not one out of hundreds of users who have started a session went past page two. In this case, the eBook-chapter-section is likely an ineffective learning tool which should not be used in future years for similar types of students.

Optimal Estimation

In the standard filtering theory one has that the observations are a distorted, corrupted partial measurement of the signal, according to a formula such as:

$$Y_k = h(X_{t_k}, V_k)$$

where $t_k$ is the observation time for the $k^{th}$ observation and $\{V_k\}_{k=1}^{\infty}$ is some driving noise process, or some continuous time variant.

The requirement is to construct a device which can efficiently determine the conditional distribution of the state of the signal given all observations up to the current time, that is, $$P(X_t \in dx \mid \sigma\{Y_q, 0 \le t_q \le t\})$$

Generally, this device is referred to as an optimal tracker. Also, the device should provide smoothers to estimate past signal states and predictors to estimate future signal states, that is, $$P(X_{\tau_s} \in dx \mid \sigma\{Y_q, 0 \le t_q \le t\})$$

and $$P(X_{\tau_p} \in dx \mid \sigma\{Y_q, 0 \le t_q \le t\})$$

where $\tau_s < t$ and $\tau_p < t$.

In an embodiment, we utilize a non-linear filter ("optimal tracker") for estimating a conditional probability distribution for current signal states which contain both the user and resource characteristics.

In an embodiment, the overall estimation process involves the set of two filters objects: $F(U_t^i, P)$ and $F(R_t^j, P)$.

$F(U_t^i, P)$: for estimating user $U^i$ characteristics, we utilize a non-linear filter for estimating a conditional probability distribution for current signal states ("optimal tracker") and for past user signal states ("smoother") $\overline{F}(U_t^i, P)$. This filter will be updated in real-time (or near real-time) using filter estimates of resources $F(R_t^j, P)$ to process observations.

$F(R_t^j, P)$: for estimating resource $R^j$ characteristics, we utilize non-linear filters for estimating a conditional probability distribution. This filter may be updated upon the request by an author user or other administration user using filter estimates of "smoothed" users $\overline{F}(U_t^i, P)$ to process observations.

The process is as follows:
1. $t_0$: Initialize z=0
2. $t_0$: Initialize $\overline{F}(U_t^i, P)$ conditional probability distribution
3. $t_0$: Initialize $\overline{F}(R_t^j, P)$ conditional probability distribution
4. $t_k$ where $1 \le k$:
   a. Evolve conditional probability distribution for $\overline{F}(U_t^i, P)$ according to signal model by $t_k - t_{k-1}$.
   b. If received session observation $Y_{t_k}$ of type assessment or question answer activity
      i. Update $\overline{F}(U_t^i, P)$ with $Y_{t_k}$ and $F(R_t^j, P)$ given $R^j$ is the session question being asked and answered.
   c. If system flag is received to update resource $R^j$ (i.e. like in the summer time), then i. Update F ($R_t^j$, P) with $\{Y_{t_z}, Y_{t_{z+1}}, \ldots, Y_{t_k}\}$ using current smoothed filters for user corresponding to the observations $$\{\overline{F}_{t_k}(U^{Y_{t_z}}, P), \overline{F}_{t_k}(U^{Y_{t_{z+1}}}, P), \ldots \overline{F}_{t_k}(U^{Y_{t_k}}, P)\}.$$

ii. Update j=z

Filtering Approximations

In order to implement a non-linear filter, approximations must be made so that the resulting non-linear filtering equations can be implemented on a computer architecture. Different approximations are made and along with these approximations different data structures and algorithms are developed, in order to use a particle filter or a discrete space filter. These approximations are highlighted in the following two examples:

Examples of Non-Linear Filtering Approximation Systems
1. SElective Resampling Particle (SERP) Filter (U.S. Pat. No. 7,058,550)
2. REfining STochastic Grid (REST) Filter (U.S. Pat. No. 7,188,048)

REST Filtering Process Overview

In one preferred embodiment, we implement the filtering process with the following iterations at every c-time increments:
1. Set up filter object by performing at least one of the following:
   a. Creating REST cells and REST tree structure: Discretize signal state by grouping attribute levels. For example, in an embodiment, we may wish to group difficulty and proficiency levels of the user proficiency level state space and resource difficulty state space into three grouping categories {{0}, {1, 2}, {3}, {4, 5}; {6}} reducing the space from 7 to 5. Similar type of grouping can be done for all attribute levels.
   b. Set particle count to one for every REST cell (optional).
2. Initialize conditional estimate by setting particle count to each cell at time t=0.
3. Evolve the filter distribution according to the signal evolution model by $\epsilon$ with the user of imaginary clocks.
4. Process observations that arrived since last update via REST push_down_observation technique.
5. Refine the conditional estimate by performing at least one of the following:
   a. REST prune_tree procedures,
   b. REST split_or_merge procedures,
   c. REST drift_back_to_initial_distribution procedures, and
   d. REST particle control procedures.
   e.
6. Go to 3.

SERP Filtering Process

In one preferred embodiment, we implement the filtering process with the following iterations at every $\epsilon$-time increments:
1. Create M particles
2. Initialize particles over the signal state space
3. Evolve all particles according to the signal evolution model by $\delta$.
4. Process observations that arrived since last update.
5. Refine the conditional estimate: SERP Filter: perform unbiased re-sampling procedure.
6. Go to 3.

Initialize Filter's Conditional Estimate
a. Using maximal amount of information: In one preferred embodiment, we initially set a user's value by using previous courses' pre-requisite LO grades along with the learning objectives covered in the previous course. If no such information is made available, the system generates a pre-assessment test.
   Otherwise if no a priori information is present the initial distribution is set uniformly.
b. Resources: In an embodiment, setting the distribution for resource characteristics may be done through the authoring tools of the platform by a subject matter expert.
   Edits: In an embodiment, the normal distribution is used with mean set to the subject matter experts setting and variance based on the author's communication skills attribute if localized by filter.
c. System defined: In one preferred embodiment, the initial distribution may be set by the system given the context for use of filtering. For example in the context of a final exam assessment, the initial distribution may be set to uniform indicating a "fresh" start.
d. User defined: In one preferred embodiment, the initial distribution will be set by an instructor or institutional user.
   For example: if an institution has scored to entrance exams or the course admittance requires some minimum base pre-requisite knowledge and proficiency.
e. To assist in detection: In another embodiment, we may want to ensure that no area of the signal state space is un-represented. In the REST filter, this is done by initially setting each cell with particle count of at least one. In the SERP filter, this is done by placing the particles in the appropriate position such that the collection of particles would cover the signal state space, and then simulating or sampling the remainder of particles, if any, with the desired distribution.

Action Strategies

As mentioned before, the filter's output is very useful in taking advantageous actions based on the information provided. In many circumstances, the action to be taken can best be chosen via an optimal action strategy. An optimal action strategy uses mathematics to determine the best course of action given the filter's output. This can reduce human errors in the interpretation of the filter's output and calculation or execution of action.

There are several action strategies we illustrate:

We use the term "residual over an attribute between A and B" to mean the normalized probability distribution resulting in taking the point-by-point difference between distributions A and B.

In an embodiment we use at least one of the following to set the desired or optimal resource generation request object (i.e. setting ideal attribute distributions):

action strategy setting A: residual between I or other user's request object (e.g. an instructor's setting for desired characteristic distributions if available), and the distribution formed by all appropriate resources already presented to the user, action strategy setting B: residuals between 1 or other user's request object (e.g. an instructor's setting for desired characteristic distributions if available), and the normalized distribution formed using the filter variance (i.e. a localization score of an attribute), and action strategy setting C: utilize the observation model (i.e. probability of success) and filter estimate for user and resource to determine the desired characteristic distribution based on a user's input for the change of success if not specified then set to a default such as 50%.

In using residuals, the choice in which attribute to consider is system feature or end result dependent. Once the generation request object is created, the system's resource generation feature (or some other higher level object using the generation feature) will solve and present to the user the final desired product. A report of the user's deficiencies may also be generated for the user. The following are examples of how the above-mentioned action strategy settings may be implemented.

1. Batch Formative Assessment: User u does not identify preference on LO (i.e. $\alpha_1(RQ)$=NULL), requests the generation of an assessment for an ideal time $\alpha_{10}(RQ)$=x Minutes.

In an embodiment, the action strategy system:
sets missing $\alpha_1(RQ)$ based on at least one of the following:
  a. action strategy setting A over LO at a difficulty level range (e.g. inform over difficulty levels [2-4]), or
  b. action strategy setting B, or
  c. action strategy setting C with 75%.
generates assessment resource based on RQ object created using resource generation engine,
presented question to user and start session $S^s$ (assessment type),
terminate session $S^s$ upon last answer submission in assessment,
updates filter estimate based on the result in $\alpha_5(S^s)$,
present solution and start new session $S^{s+1}$ (of learning type),
terminates assessment session $S^{s+1}$ using appropriate session exit,
update filter estimate now based on the traffic generated by user learning from full solution or answer key (update filter with both $S^{s+1}, S^{s+1}$),
exit.

E.g. for LO breadth Assessments are practice exams, self study or exam preparation.

2. One-by-One Adaptive Formative Assessment: User u does not identify preference on LO (i.e. $\alpha_1(RQ)$=NULL) and ideal total time not set $\alpha_{10}(RQ)$=NULL, then request the generation of an adaptive assessment.

In an embodiment the action strategy system:
sets missing the number of ideal question slots to one (i.e. $\alpha_{13}(RQ)$=1)
sets $\alpha_1(RQ)$ based on at least one of the following:
  a. action strategy setting A over LO and difficulty,
  b. action strategy setting B over LO and difficulty,
  c. action strategy setting C with 50% success, or
  d. for highly motivated learner's action strategy setting C with 30% chance of success, and for easily discouraged learners (i.e. filter's localization on low motivation score levels) start with action strategy setting C with 80% and move towards 50% based on number of questions asked,
generates assessment resource (next question since $\alpha_{13}(RQ)$=1) based on RQ object created using resource generation engine,
presented question to user and start session $S^s$,
terminate assessment session $S^s$ upon answer submission,
updates filter estimate based on the result in $\alpha_5(S^s)$,
present solution and start new learning session $S^{s+1}$,
terminate assessment session $S^{s+1}$ using appropriate session exit,
update filter estimate now based on the traffic generated by user learning from full solution or answer key (update filter with both $S^{s+1}, S^{s+1}$),
check termination criteria based on filter's estimate on $\alpha_1(u, l)$,
go to 2.

3. Formative Study Pack Generation: User u does not identify preference on LO (i.e. $\alpha_1(RQ)$=NULL), requests the generation of an assessment for an ideal time $\alpha_{10}(RQ)$=x Days, Weeks or Months.

SAME AS EXAMPLE #1 EXCEPT NOW WE SET $\alpha_{14}(RQ)$ and the resource generated is a study pack or courseware.

4. One-by-One Formative Study Pack Generation: User u does not identify preference on LO (i.e. $\alpha_1(RQ)$=NULL) and ideal total time no set $\alpha_{10}(RQ)$=NULL, then request the generation of an adaptive one-by-one formative study pack. We also estimate user's learning style, and if question/solutions is just not working in terms of student learning, maybe after a question type, the next resource should be of a different learning style of format such as an interactive video or appropriate learning forum. In an embodiment the action strategy system:

SAME AS #2 EXCEPT NOW WE SET $\alpha_{14}(RQ)$ and the items are no longer limited to questions.

5. One-by-One Adaptive Summative Assessment: Instructor or institution sets $\alpha_1(RQ)$ but not $\alpha_1(RQ, m, d)$, set $\alpha_{10}(RQ)$=NULL, then request the generation of an adaptive summative assessment.

In an embodiment the action strategy system:
creates a new filter for this session and initialize using the uniform distribution strategy,
sets missing the number of ideal question slots to one (i.e. $\alpha_{13}(RQ)$=1)
sets $\alpha_1(RQ)$ based at least one of the following
  a. action strategy setting C with 50% success (or arbitrarily sets by assessment administrator),
  b. action strategy setting A over LO and difficulty,
  c. action strategy setting B over LO and difficulty,
generates assessment resource based on RQ object using resource generation engine (i.e. pick next question),
presented question to user and start new session $S^s$ and add to container or parent session structure if appropriate,
process session information in $S^s$ (i.e. update filter's conditional estimate),
terminate assessment based on localization on all LO else go to step 2.

6. Reporting Learner Root Deficiency: In an embodiment, through a user request mechanism, the system can provide reports on a student-user (learner) and display it to at least one of:
an appropriate instructor user,
to the learner's parent, and
to the learner.

In another embodiment, the system may further generate a report with suggested links to resources generated for the learner (as mentioned above in study pack generation) by at least one of:
using action strategy setting A for LO proficiency,
action strategy setting B for LO proficiency, and
setting Visual Preference Distribution, Auditory Preference Distribution and Tactile/Kinesthetic Preference Distribution with that of the user's estimate if not overridden by user himself/herself into a request generation object.

In another embodiment, the system may further generate a report with suggestions to other users of the system for tutoring purposes that have strength in this particular user's root deficiencies. In an embodiment the system may produce such search results by action strategy setting A into a request generation object for system users as resources. The report may recommend the user contact a second user such as a tutor.

7. Reporting Learner Proficiency:
SAME AS #6.

In another embodiment, the system may further generate a report with suggestions to other users of the system for tutoring purposes that have root deficiencies in areas in which this learner has strong proficiency.

8. Reporting Learning Resource Quality: In an embodiment, the system may generate a report directed to an instructor on resource quality estimates. In another embodiment, the system may generate a report directed to authors of the resource.

9. Reporting Question Bank Item Quality:
SAME AS #8. Questions are resources.

Estimating User Identity

The signal and observation model of this system and method may also be employed to estimate the identity of users who access the learning system. Ensuring the identity of test takers and the integrity of online home invigilated exam/test results is a key challenge with online education. We see there being two aspects to home invigilation for high stake assessments: student identification and proctoring. The heart of the problem in both aspects lie in the fact that in an online home invigilated exam both the computer and exam environment are uncontrolled, thereby making it "un-trusted".

In order to track user identity, the signal model may also include user patterns and tendencies when using software, such as Graphical User Interface traffic vs. keyboard shortcuts and keystroke rates. For example, if a user has throughout a semester not used any keyboard shorts within the system, then a sudden increase of the use of those shortcuts during a final examination that demonstrate a much higher technological proficiency than was previously observed may indicate that the user is not the same user. In this example, if the event in which the increase in use of shortcuts for a given session given a user's profile is sufficiently improbably, the system may flag the user as masquerader. Moreover, if the proficiency of the user has increased at a highly improbable rate or if the biometrics of keystrokes when the user typed his password are not consistent with the user's signal profile from throughout the year, then again the system may flag the user as a potential masquerader. Flagging the user as a potential masquerader may also mean that a report or notice is generated for a proctor or instructor that will confirm the identity through other means (e.g. such as government issued photo identification).

Permission & Copyright

In an embodiment, the system allows users (student, authors, instructors, etc . . . ) to author and create new resources $R^r$ in a collaborative system.

For example:
1. user $U^{author}$ creates a resource $R^r$ (e.g. a 10,000 item question bank). $U^{author}$ is the copyright holder,
2. user $U^{instructor}$ a teacher and is able to search and find $R^r$ and use it through the system tools (i.e. use it in $U^{instructor}$'s weekly homework),
3. user $U^{instructor}$ is a student of and is able to only read the question and not be able to interact with it nor see the full solutions without paying $5 through the system's online store,
4. user $U^{sales}$ is in charge of going from institution to institution and try to sell $R^r$,
5. user $U^{colleague}$ is subject matter expert in the area and wishes to contribute freely his time to make small edits,
6. user $U^{coordinator}$ is wanting to use the database but needs to make and maintain their own version of $R^r$ since their school is a religious school and many of $U^{author}$'s examples are inappropriate. In fact $U^{coordinator}$ is willing to pay $10,000/yr. for rights to use and modify,
7. user $U^{chair}$ is the chair of the department in which $U^{author}$ belongs to and reminds $U^{author}$ that he does not have ownership of the copyright, but the school does. After some debate, the school represented by $U^{chair}$ and $U^{author}$ come to an agreement that from now $U^{chair}$ will share rights for $R_{t_k}^r$ but any derivative works, produced by $U^{author}$ solely belong to $U^{author}$ (i.e. $R_t^r$ where $t > t_k$),
8. user $U^{publisher}$ finds $R_{t_k}^r$ and wants to manage a larger sales team, she promises all revenues coming to $U^{publisher}$ will be shared 50-50 with the $U^{author}$,
9. user $U^{publisher}$ finds $R_{t_k}^r$ and wants to manage a larger sales team, she promises all revenues coming to $U^{publisher}$ will be shared 50-50 with the $U^{author}$,
10. user $U^{chief\_editor}$ has many editor underneath her and was hired by $U^{author}$ to changing all the graphics work so he can differentiate with his own department. With so much work, she needs to delegate and work in parallel with her staff,
11. user $U^{china}$ is a professor in china and he would like to take the database and translate it $R^r$ for Chinese students/teachers, but also wants to all to translate it to Japanese, Korean, and Russian.
12. user $U^{brother}$ is $U^{author}$'s brother and is very trustworthy. He wants to give him a chance to be his equal.

We define a new object structure for permissions and rights object $\Omega^\omega \in \{\Omega^j\}_{j=1}^{|\Omega|}$ ("permissions object").

Default: Due to the recursive nature of system resources, once a permissions and rights object is created, all resource segments inherit the same permissions object.

In another embodiment, the grantor $\alpha_5(\Omega^\omega)$, may give a separate write permissions object for any segment of the resource $\alpha_3(\Omega^\omega)$.

Permission Type: {R, C, W} in English means: Read, Copy and Write. In an embodiment, copy means to create a copy of $\alpha_3(\Omega^\omega)$, write means to write (or author) the "original" resource $\alpha_3(\Omega^\omega)$ directly, and read means to read or load with system tools resource $\alpha_3(\Omega^\omega)$.

Copy implies you have read and write on the COPY and not the original $\alpha_3(\Omega^\omega)$.

In an embodiment, we expand the space to allow for more actions. For example an execute action denoted by E such that the new space {E, R, C, W}. An example where an execute action may be used is in the example where a user (typically an instructor user) shares a scheduled request objects (e.g. homework). In this case the previously stated three actions, read, copy and write do not make much sense. The request object for the end user (i.e. receiving student) is only "executed" by the resource generation object to produce a resource wherein the student will have read permissions to the newly created learning tool.

Granting Level: In an embodiment, we define {Y, G, SG} in English means: Yes, Granting and Super Granting. This set is ordered or ranked in the sense where Granting status can only grant a Yes status for the Permission Type in which it belongs, and Yes can only grant an implicit No.

The only exception to this rule is SuperGrant which can grant other SuperGrant level statuses.

Permission Tuple: The tuple then represents both the permission and granting level.

In the example scenario above, we map all users and the minimum permission tuple they need in the table below:

TABLE 7

|   | Y | G | SG |
|---|---|---|---|
| R | $U^{instructor}$ | $U^{sales}$ | $U^{publisher}$ |
| C | $U^{coordinator}$ | $U^{china}$ | $U^{chair}$ |
| W | $U^{colleague}$ | $U^{chief\_editor}$ | $U^{brother}$ |

In an embodiment, we referenced the most naturally occurring agreement templates in $\alpha_8(\Omega^\omega)$. For example:
1. R,Y: end user agreement
2. C,Y: customization agreement: e.g. derivative works allowed for educational use. Typically these are instructors that do not like any textbook since they pride themselves on having unique teaching styles or the course they are teaching is very unique and no ideal textbook exists. These instructors want an eLearning publishing platform with tools that:
   allow customizability and flexibility,
   allow instant updating and a process for evolving their work,
   are convenient and easy to use, and
   are inexpensive for their students.
3. W,Y: co-authorship/collaboration agreement
4. R,G: sales agent agreement
5. C,G: distribution agreement
6. W,G: editorial agreement
7. R,SG: publishing agreement
8. C,SG: branching works (collaboration termination) agreement
9. W,SG: partnership agreement In an embodiment, we expand the space to allow for more levels of grants $\{Y, G^1, G^2, G^3, \ldots, SG\}$. This is especially useful the SuperGranter wants to control the distance in which derivative works can branch.

TABLE 8

| j | Symbol | Description of field j for $\Omega^\omega$ |
|---|---|---|
| 1 | $\alpha_1(\Omega^\omega) \in \{R, C, W\} \times \{Y, G, G^n\}$ Permissions and Rights Tuple | Permissions and Rights Tuple: Described above |
| 2 | $\alpha_2(\Omega^\omega) \in \{Uj\}_{j=1}^{|U|}$ Who | Who: user or user group through recursive structure. |
| 3 | $\alpha_3(\Omega^\omega) \in \{Rj\}_{j=1}^{|R|}$ What | What: a resource on the system. |
| 4 | $\alpha_4(\Omega^\omega) \in \{ScopeObjects\}$ Where | Where: in an embodiment, defines scope geographic via IP, by institution, a server, a user group within the system. |
| 5 | $\alpha_5(\Omega^\omega) \in (0, \infty]$ When | When: expiry. In an embodiment, we define or allow $\alpha_5(\Omega^\omega) = \infty$. |
| 6 | $\alpha_6(\Omega^\omega) \in \{Uj\}_{j=1}^{|U|}$ Grantor | User who granted $\alpha_2(\Omega^\omega)$ with this permission tuple. |
| 7 | $\alpha_7(\Omega^\omega) \in \mathbb{R}$ Purchasable Price | Price Paid for this permissions object |
| 8 | $\alpha_8(\Omega^\omega)$ Other Terms | In an embodiment, this field is set to any extra rules and terms the granting of this $\Omega^\omega$. For example: Sales Agent Agreement, Derivative Works Agreement, Open Source Agreements, CopyLeft, Revenue Sharing, Publishing Agreement, methods of payment, etc . . . |

Permissions may be important where the system and method employs authoring tools in creating and modifying potentially copyright materials (e.g. including annotations, scientific and mathematical equations and formulae, graphs, eBooks, questions, solutions, worksheet questions, etc . . . ).

Allowing users to seamlessly create and edit content containing text, web components such as tables, lists, as well as scientific equations and expressions requires the computerized learning system to track which users have permission to use which resources and at what times.

SmartType and Authoring Tools

In an embodiment, the system and method may implement an integrated symbol writing system which does not require any additional plug-ins or software in order to run so that information may be updated within an ordinary web browser. For example, for documents that have a copy grant, then the future users may be the ability to change and updated the document.

Within an eLearning/eAssessment/ePublishing/eTutoring platform environment ("system"), authoring tools may allow users to do the following:
   quickly develop learning tools such as book, lecture notes, audible lectures, questions and solutions into a modern course offering (e.g. authors, instructors, course coordinators) and share, assign or publish it to other users,
   quickly enter mathematical or other scientific notation within a full text editor,
   be intuitive for first time while not cumbersome for experience and power users,
   collaborate editing or development of resources with collaborators,
   receive meaningful feedback to evolve resources; into a more comprehensive learning package through the system.
   create and edit complex documents with mathematical and scientific equations with ease.
   type scientific expressions/equations much faster thus increasing productivity in writing mathematical and scientific content such as questions, solutions, papers, instructions, etc. Main efficiency gains will be from the predictive capabilities of the authoring tools. Current solutions do not have such predictive feature.

In an embodiment, the system may have predictive capabilities to optimally reduce user number of keystrokes on scientific equations and expressions. This means students/learners will be able to enter online mathematical/scientific symbols and expressions quickly and with minimal frustration.

In an embodiment, the system integrates scientific symbols in-line with text (SmartType) in content within a computerized learning system, comprising:
   switching from text mode into scientific mode;
   converting plain-language text input into scientific code;
   displaying a graphical representation of the scientific code in-line with the text; and
   adaptively predicting plain-language text input using context-based prediction.

In this description in-line means for each user keystroke there is at least one of the following responses:
   newly rendered symbol or graphical representation of what is inputted by the user, and
   helpful hints or error messages to guide inexperience users on how to user this authoring tool.

In an embodiment, the system uses a Markov Chain model by describing the transition probabilities from a sequence of n-key-strokes to the next m-key-strokes.

$$P^{U^u}\left(\begin{bmatrix}\zeta_{t_{k-1}}\\\zeta_{t_{k-2}}\\\vdots\\\zeta_{t_{k-n}}\end{bmatrix}\to\begin{bmatrix}\zeta_{t_{k+m-1}}\\\vdots\\\zeta_{t_{k+1}}\\\zeta_{t_k}\end{bmatrix}\bigg|\alpha_2(S^s),\alpha_1(\alpha_1(S^s))\right)$$

where for the session object $S^s\alpha_4(S^s)$=Authoring, $\alpha_2(S^s)\in$ System Feature/Tool Set and $\alpha_1(S^s)$ is the resource therefore $\alpha_1(\alpha_1(S^s))$ and $\alpha_1(\alpha_1(S^s))$ and $\zeta_{t_m}$ corresponds to a key-stroke at time $t_m$ by user $U^u$.

In another embodiment, we describe transition probability for key-stroke entropy ee within a time segment.

$$P^{U^u}\left(\begin{bmatrix}ee_{t_{k-1}}\\ee_{t_{k-2}}\\\vdots\\ee_{t_{k-n}}\end{bmatrix}\to\begin{bmatrix}ee_{t_{k+m-1}}\\\vdots\\ee_{t_{k+1}}\\ee_{t_k}\end{bmatrix}\bigg|\alpha_2(S^s),\alpha_1(\alpha_1(S^s))\right)$$

Such a model is used for predictive text (i.e. SmartType). In an embodiment, transition probabilities can be initialized by the various documents and learning tools (e.g. questions, solutions, subject matter content, audible lectures, worksheets, chatter-box/forum discussions, etc . . . ).

In an embodiment a new bio-metric signal for each user is measured and for each session a filter object is created in order to predict the users typing preferences and styles.

FIG. 8 shows an example of a computerized learning system. A server 802 includes a processor 804 and a memory 806. The server is connected to a database 808 and a network 810. A number of users 818 are connected to the network 810 through computers, which include a display 812, an input/output 814 and a processor 816. The processors 804, 816 may be any kind of programmable computerized system that may communicate with a communications network 810. The computers comprising parts 812, 814, 816 may each be a handheld device, for example, which may be connected to a wireless network. The computer 812, 814, 816 may be any electronic system that is programmable to carry out the functions described here and that allows a user to connect to the server 802. The network 810 may be any type of communication network that allows a user 818 to connect to the sever 802. The network may be made up of a series of communication tools such as fiber optic cable, satellite signals, wireless networks, copper wire or other methods of communication and may include the internet or other local or wide area networks including intranets. The processors 804, 816 are shown as physical objects but each may comprises one or more parts of multiple physical objects that provide processor functionality. All functions described here may be carried out by services that are locally resident or distributed across servers or hosted remotely. Memory or databases may be provided locally or remotely and may be distributed across servers in what has become known as cloud computing. All functions described here may use service mobility.

Particle Filters Generally

Figure 10:
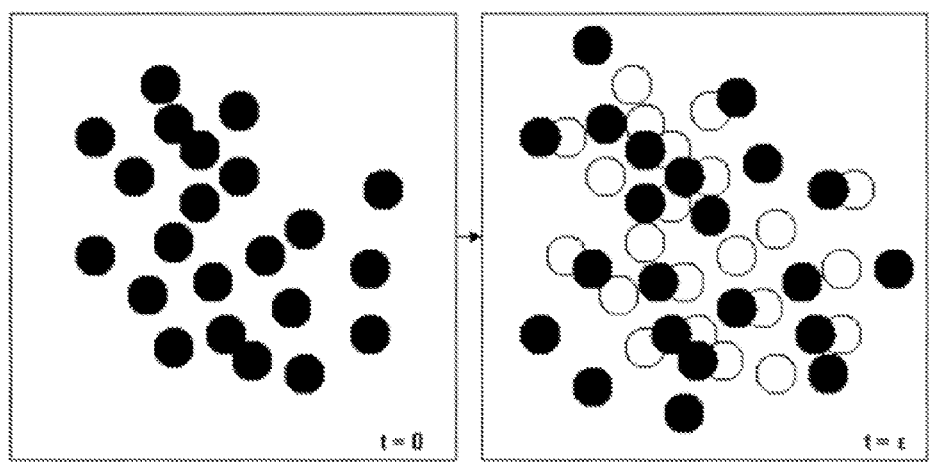
FIG. 10 is a chart showing particle updating for a non-linear particle filter.
Figure 11:
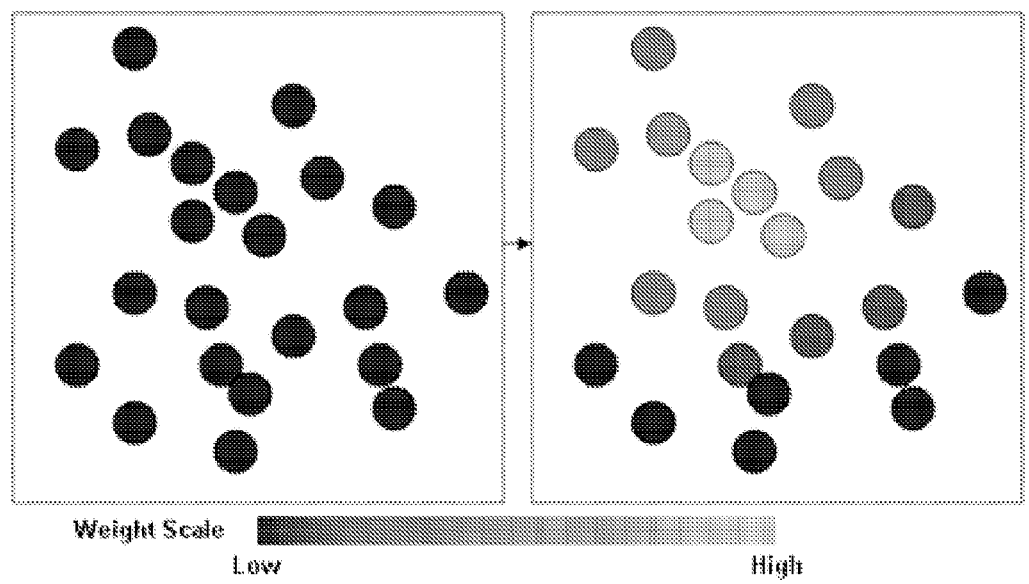
FIG. 11 is a chart showing particle weighting for a non-linear particle filter.

Particle filters are essentially sophisticated Monte-Carlo methods that approximate the optimal nonlinear filter by somehow fitting Monte-Carlo trials to the observations received. These filters utilize copies of the signal model (entitled 'particles') to yield its conditional estimate and distribution. Initially, particle filters distribute the particles in a manner that approximates the initial guess as to the likelihood of the state of the signal. Each particle is also assigned an initial relative worth, or weight. This weight is typically the same for all particles initially, since there is no information from any data. The particles then evolve using the mathematical model for the signal, as shown in FIG. 10. When new observation data arrives, a particle's weight is updated based on how well the particle's state conforms to the information from the observation, as demonstrated visually in FIG. 11. This process continues as new information arrives. In FIG. 10, particle evolution is shown with initial locations on the right shown with the filled in circles.

Particle filters calculate a conditional estimate based on a weighted average of all particles' states. As the number of particles tends towards infinity, the computed estimate becomes ever closer to the value provided by the optimal filter.

The basic algorithm presented above presents the standard particle filter typically known as the Weighted Particle Filter. Subsequently 'adaptive' particle filters were developed which added a resampling step after the weight update step. Resampling modifies the filter by copying, adding, and/or removing particles in order to increase both the computational efficiency and the estimation fidelity.

Discrete Space Filters Generally

Discrete space filters are a distinctly different type of approximate solution. Discrete space filters operate in circumstances when the domain of the signal (that is, the range of values for the variables that make up the state of the signal) is closed. This means that the domain cannot have values that reach infinity. Despite this restriction, discrete space filters can work on most interesting applications.

Figure 12:
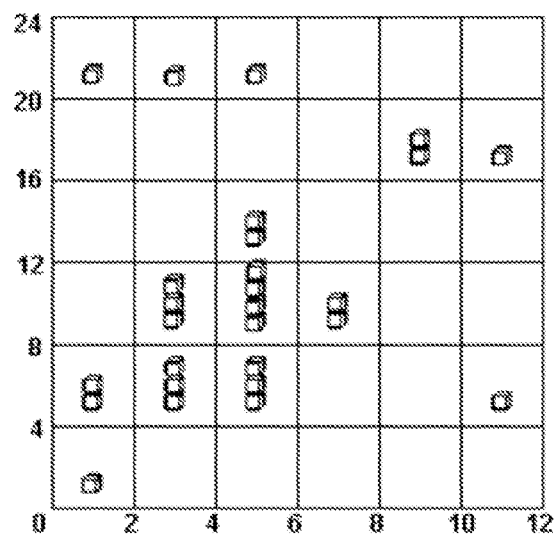
FIG. 12 is a chart showing a discrete space grid with particles.

The premise behind discrete space filters is that the domain is broken up into a number of blocks, or 'cells', each representing a distinct area of space within the domain. For instance, if the domain is a two dimensional area, then the cells can form a cross-section grid the domain. Similar grids can be constructed in higher dimensional spaces. These grids do not have to be uniformly refined; some dimensions can be broken into smaller blocks while others can have larger blocks. FIG. 12 shows a discrete space grid with particles.

Discrete space filters place a 'weight' (usually called a point mass) in each cell. This point mass represents the relative likelihood that the signal's state currently exists within the region of the domain. The point mass value within the cell is usually called the cell's 'particle count', and is shown in FIG. 12. Unlike the particles used in particle filters, these particles are not copies of the signal.

In between observations, discrete space filters evolve their particles by transferring particles between neighbouring cells, creating new particles within the cell, and destroying particles within the cell. These changes in the particle counts occur at certain rates over time, and are based on the mathematical function that dictates the evolution of the signal. The effect of these rates is to mimic the potential movement of the signal.

When new observation information arrives, the point masses for each cell are re-calculated based on the new information in a manner similar to particle filters. The conditional distribution is formed by normalizing the point masses for each cell.

There are many challenges that are addressed when implementing a discrete space filter. For instance, the number of cells to be stored can become quite large should a fine grid be required for precise estimates. In addition, accessing and modifying the cells based on the observation information can become exponentially large without an effective indexing scheme. Moreover, the rate calculations can be cumbersome, resulting in redundant computations. In order for discrete space filters to be able to perform well, many sophisticated implementation techniques are used to deal with these issues.

Figure 13:
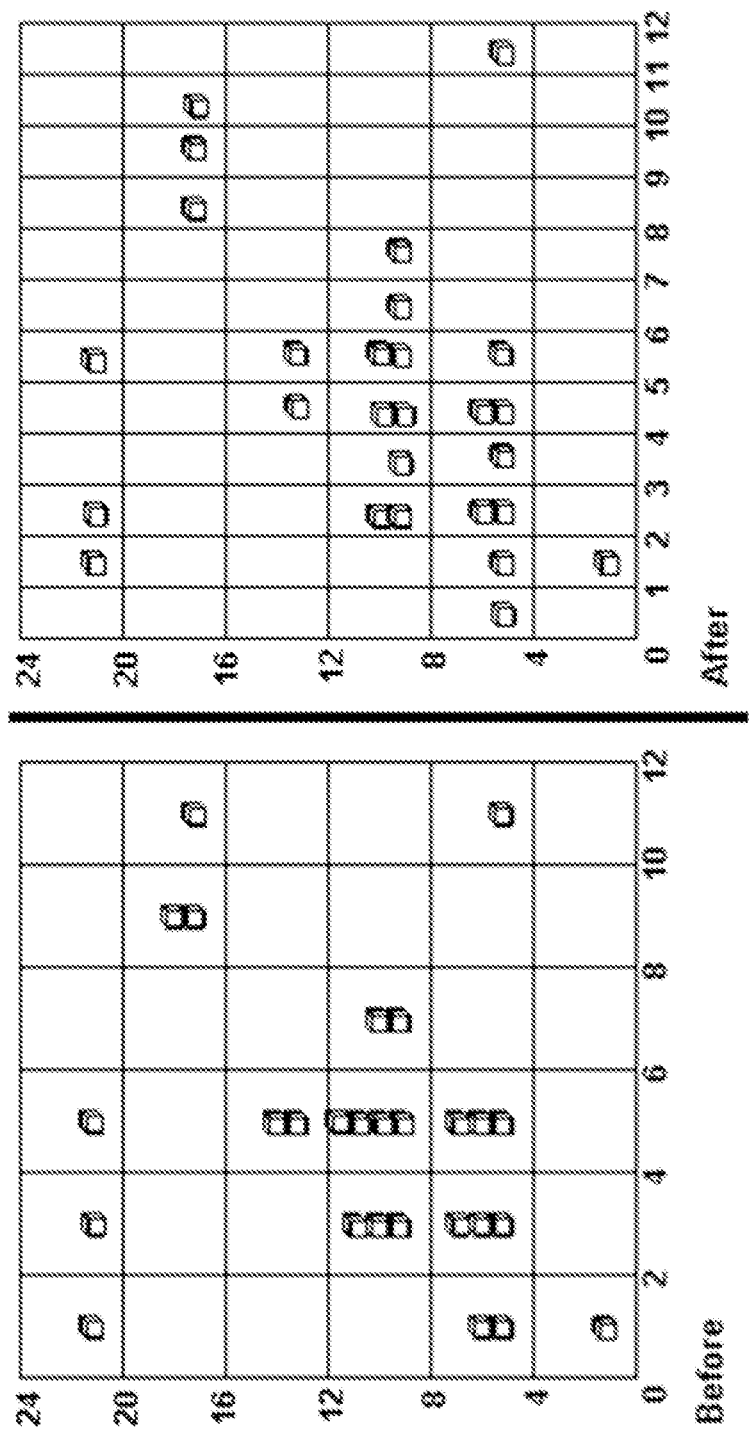
FIG. 13 is a chart showing a discrete space grid before and after refinement.

Furthermore, well-designed discrete space filters also have the ability to automatically refine the size (and consequently number) of the cells, based on the current conditional distribution. This is extremely useful, particularly when tracking signals. When a particular area of the domain has a high relative weight, the cells can be refined in order to obtain a more precise distribution. Conversely, should a filter with a highly refined grid receive several observations that reduce the preciseness of its estimates, the filter can automatically combine cells to reduce the computational load while attempting to re-acquire a good estimate of the signal's state. This type of automatic grid refinement is demonstrated in FIG. 13.

Figure 14:
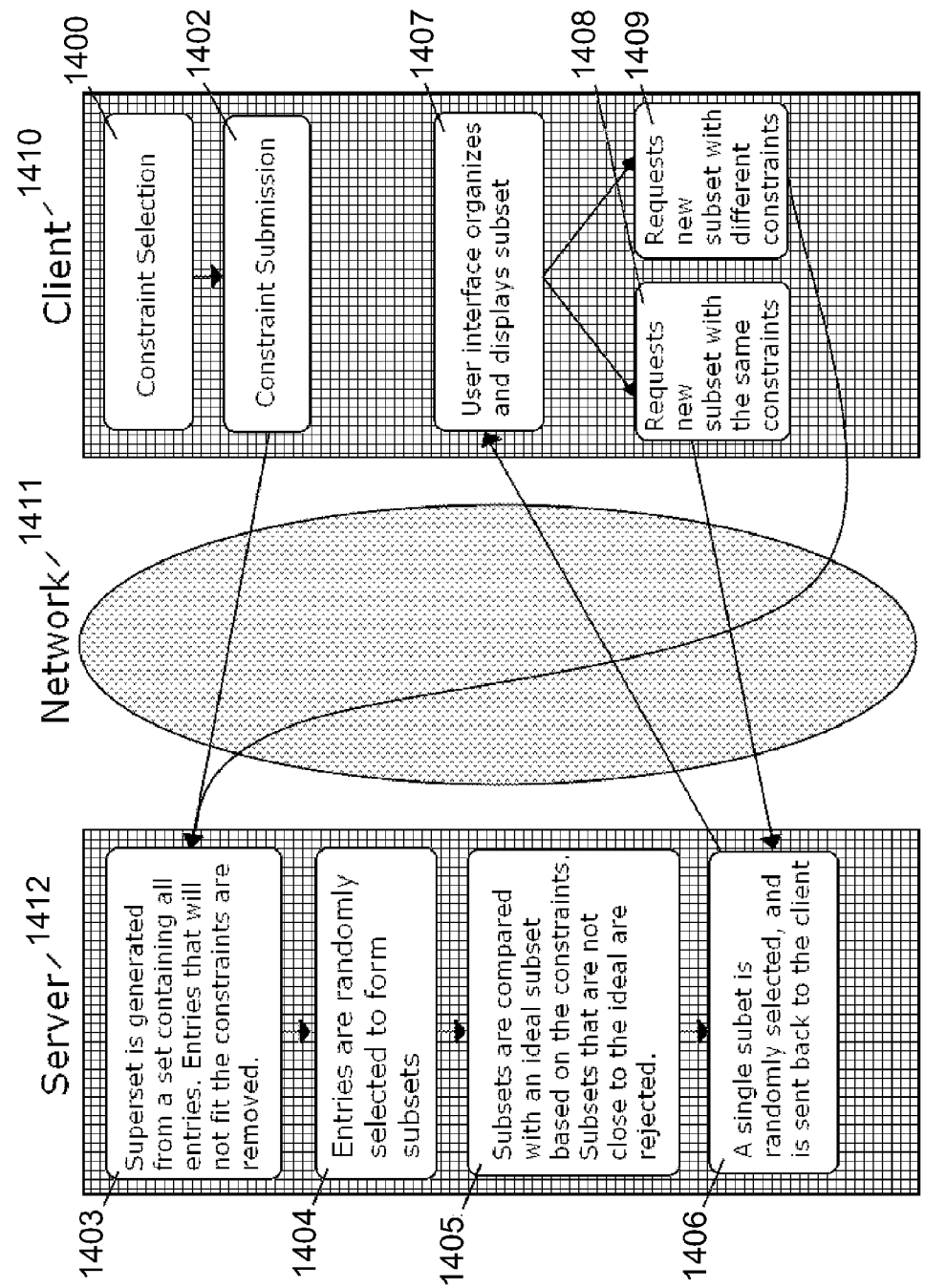
FIG. 14 is a flow chart showing a method of generating learning tools.

FIG. 14 shows one possible relationship between a server 1412 and a client 1410 for generating learning tools based on desired characteristics or constraints. In an embodiment the desired characteristics are transmitted in the form of a distribution of desired characteristics. The client 1410 will decide on what constraints 1400 to send to an algorithm stored in the server 1412. A user interface will manage the constraint selection process, and will send the constraints to the server 1412 over a network 1411, which can be either a local area network or an internet connection. The algorithm will review what constraints have been submitted by the client 1410, and will remove entries that will never fit the given constraints. This will allow for a faster computation. From a filtered domain 1403, the algorithm will select entries at random to form an amount of subsets 1404 depending on the processing power and network latency of the server 1412. An ideal subset is theoretically determined, which would represent the global minimum when the subsets 1404 are compared with a theoretical ideal 1405. Since the ideal represents what the client 1410 wants best, any subsets that are not close to this ideal are rejected. The ones that pass are sent to be randomly selected 1406, where they will be sent back to the client 1410. A client 1410 interface will organize and arrange the data 1407 received from the server 1412 accordingly. The client 1410 is able to send a request back to the server 1412, wherein it will select a new subset from the already determined set if the constraints defined in 1400 do not change. Upon changing the initial constraints and re-submitting a request to the server 1412, the process will repeat from 1403 wherein the superset will change accordingly.

Figure 15:
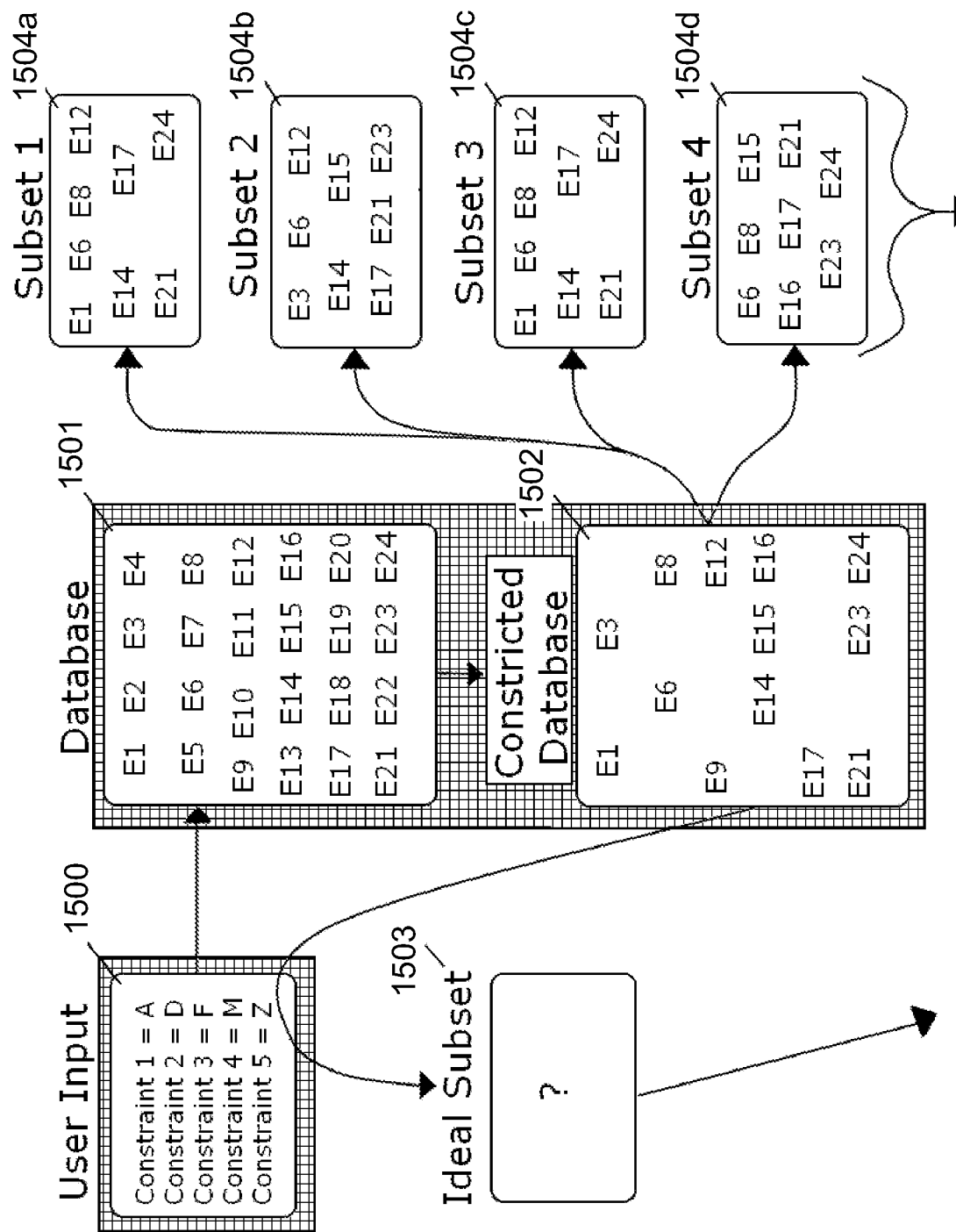
FIG. 15 is a flow chart showing the method of FIG. 14.

FIG. 15 details how the system may interact with a database 1501, and how it will select entries to be sent to a client based on the given conditions 1500. A user will predetermine what restrictions 1400, or desired characteristics, are to be sent to the database 1501. Upon receiving said restrictions 1500, an algorithm will extract entries that will not be able to fit the constraints 1500. This will change the database 1501 into a constricted database 1502 wherein the algorithm will first create a theoretical idea subset 1503 based on the constraints, and a series of randomly generated subsets 1504a, 1504b, 1504c, 1504d from the restricted database 1502. Both the ideal and the randomly selected subsets will be sent for comparison as described in FIG. 16.

Figure 16:
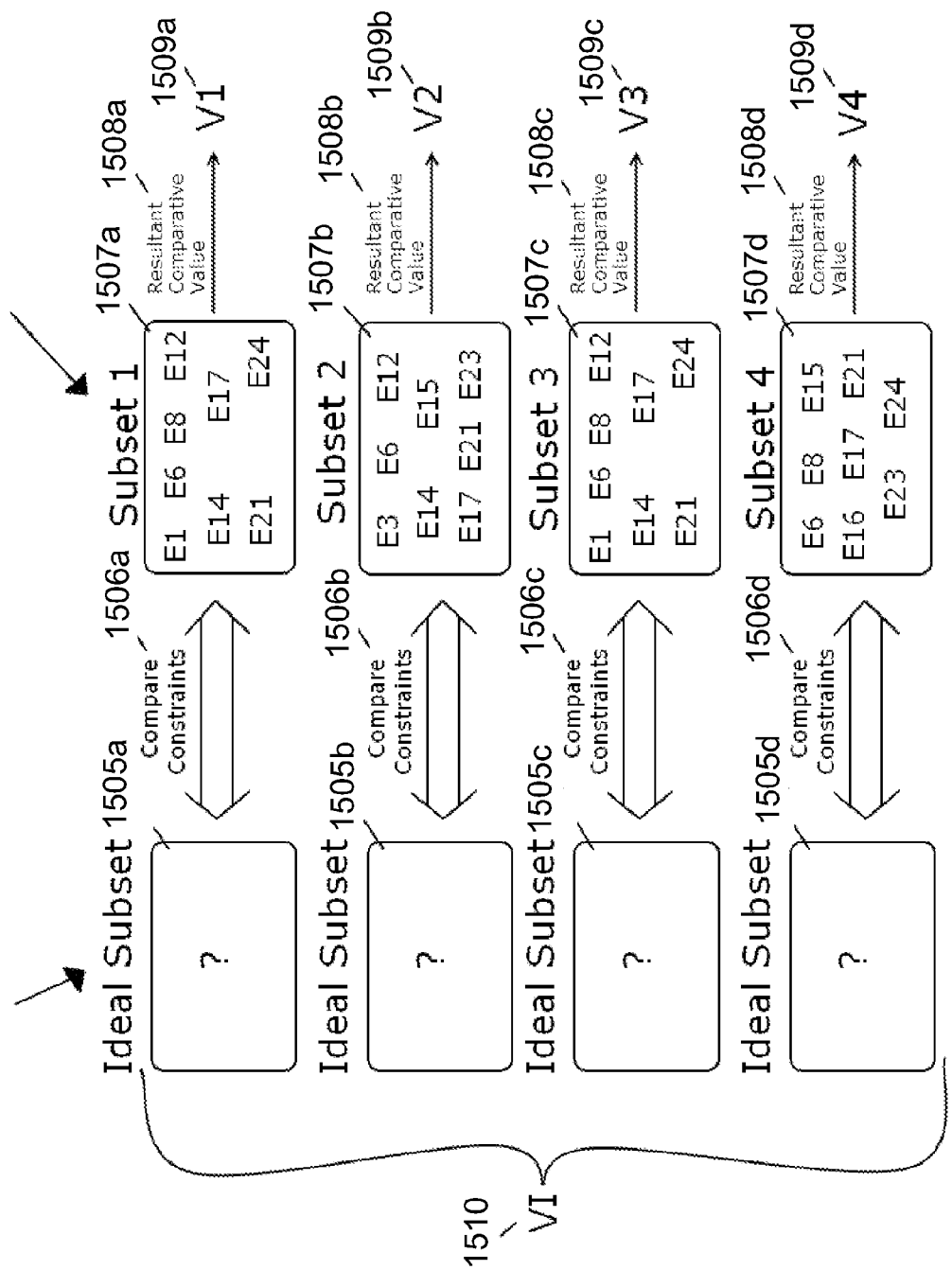
FIG. 16 is a flow chart showing the method of FIG. 14.

FIG. 16 illustrates the comparison of the subsets 1504a, 1504b, 1504c, 1504d and the ideal 1503 from FIG. 15. The ideal subset 1503 has a fixed distance from the users requested constraints 1500. This distance will be a certain value 1510, and will be explained in FIG. 16. The ideal subset 1505a will be compared 1506a to the initial conditions 1500. It should be noted that only one theoretical ideal subset is predicted, and every randomly selected subset is compared to the initial constraints as defined in 1500. Multiple ideal subsets are only illustrated for explanatory reasons. After comparing the subsets 1507a, 1507b, 1507c, 1507d to the users' constraints, values 1509a, 1509b, 1509c, 1509d are computed based on the 'distance' of the subsets 1507a, 1507b, 15207c, 1507d to the initial constraints 1500. The function 1508 is part of the algorithm used throughout the process. Values 1510, 1509a, 1509b, 1509c, 1509d are used in FIG. 17.

Figure 17:
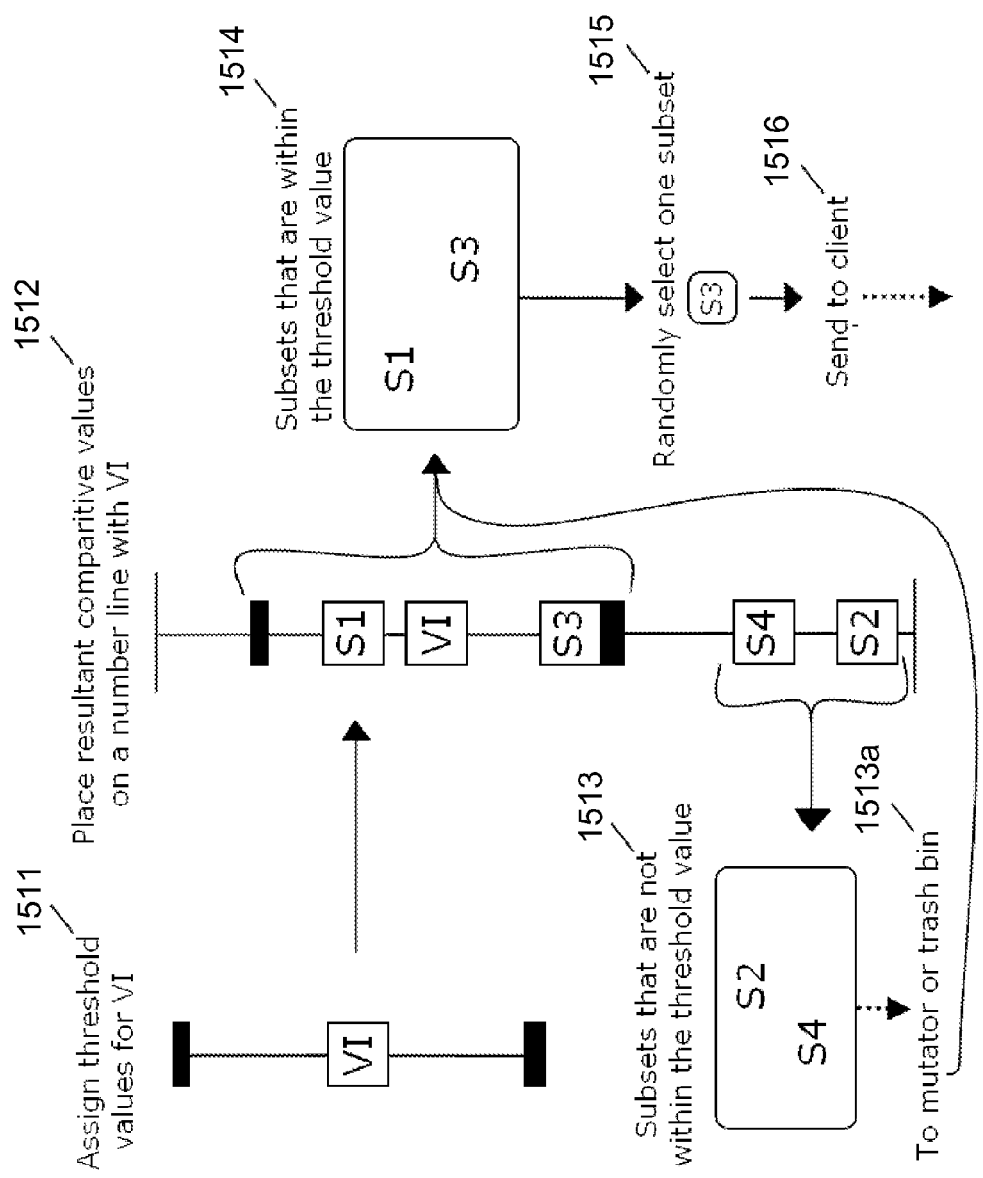
FIG. 17 is a flow chart showing the method of FIG. 14.

FIG. 17 defines how the comparative value for the ideal subset 1510 is used in conjunction with the values for the randomly generated subsets 1509a, 1509b, 1509c, 1509d. Due to the fact that the randomly generated subsets 1504a, 1504b, 1504c, 1504d will ostensibly never be an exact match to the ideal 1503, the algorithm must assign a threshold value 1511 to the ideal comparative value 1510. One way for the algorithm to compare values when one has a threshold, is to place them on a real number line 1512. This will automatically sort and allocate which values are within the desired bounds. Values that are inside of the threshold values are placed in a semi-temporary group 1514 so that they can be dealt with by the algorithm accordingly. Subsets deemed to be unfit for use by the client 1400 are outside of the threshold values, and are also placed in a semi-temporary group 1513 that will be mutated or discarded. From the set of subsets 1514 to be used, the algorithm will finally pick one at random 1515 to be sent to the user 1410, 1516.

Figure 18:
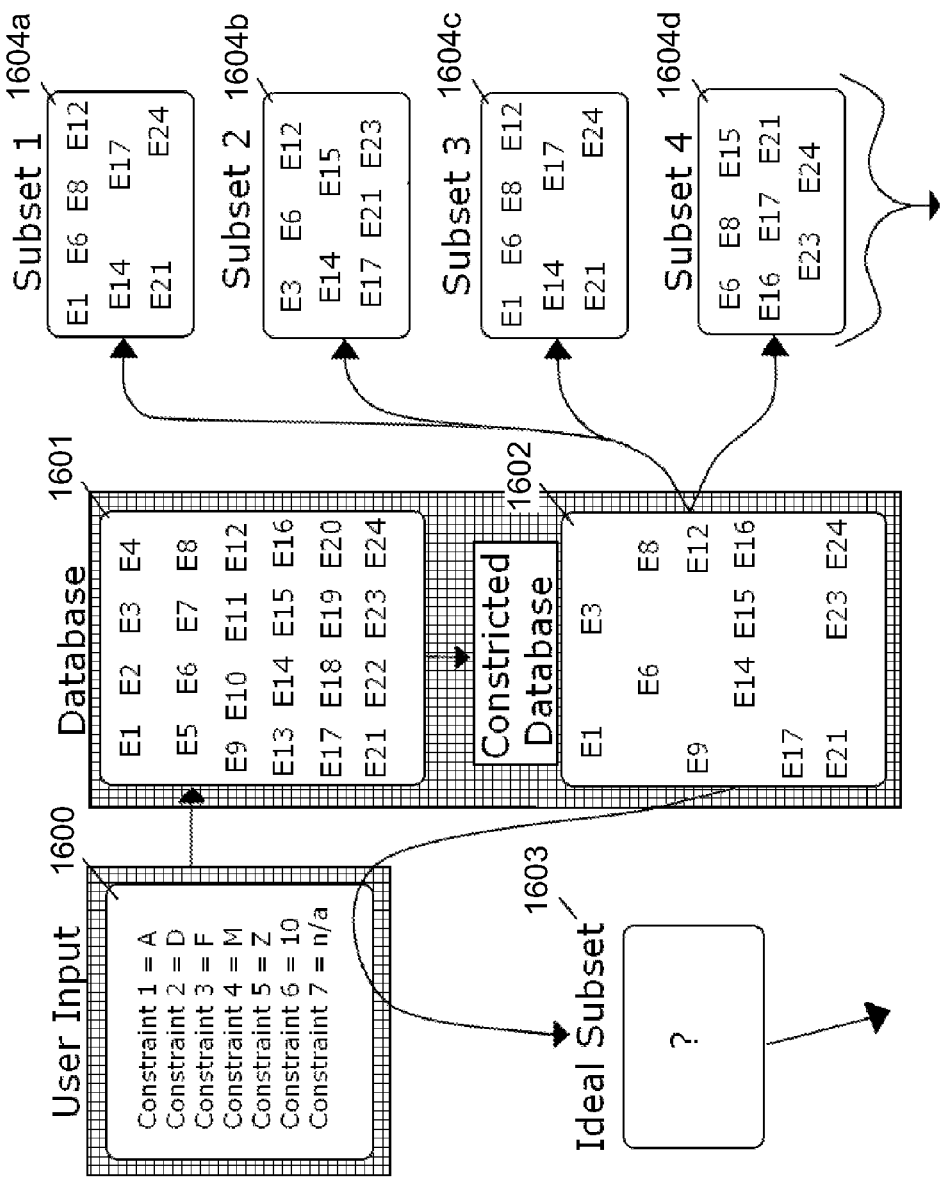
FIG. 18 is a flow chart showing the method of FIG. 14.

FIG. 18 details a constraint wherein the user can define the number of final subsets using a constraint 1600 to be sent to the user. If undefined, the algorithm will randomly select one subset to be sent to the user. If, however, the user requests multiple unique sets, the algorithm will select the appropriate number of sets that are within the threshold value. The algorithm will handle all processes until the final submission as if the constraint did not exist. Thus, the next figure avoids detailing the comparison of the subsets and the ideal to the constraints, as this process is same as shown in FIG. 16.

Figure 19:
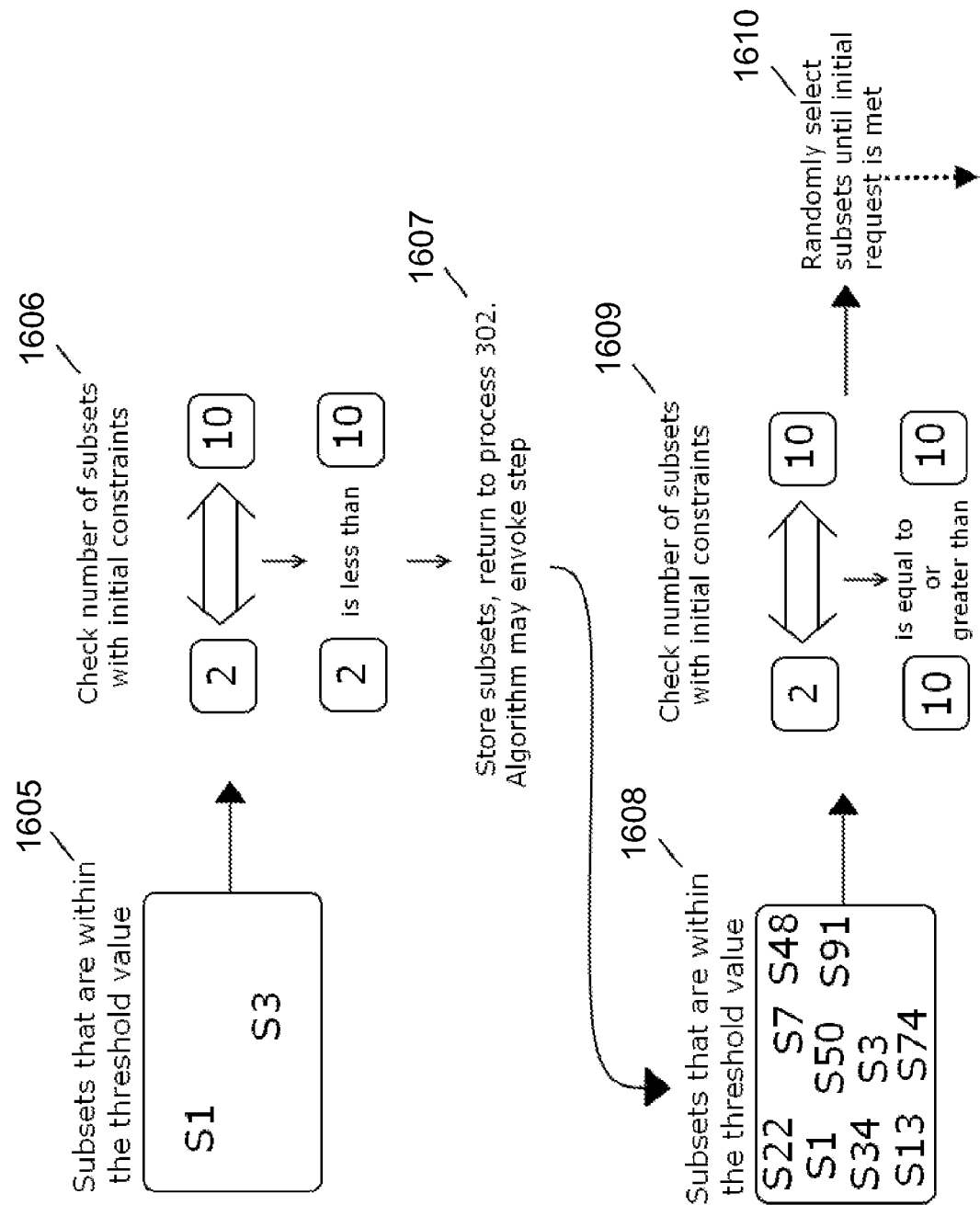
FIG. 19 is a flow chart showing the method of FIG. 14.

FIG. 19 injects the constraint 1600 in FIG. 18 into the selection process as outlined in FIG. 17, and explains how it can be used. This constraint is only relevant between processes 1514 and 1515. The processes illustrated in FIG. 19 and summarized in FIG. 18 are not limited to the conditions and restraints 1606, 1609 outlined. The constraints 1600 initially selected by the user contained a constraint that forces the system to meet a certain demand. If the demand is not met after processes 1607 is repeated multiple times, a request to supply sufficient data will be made, and will cause the algorithm to ignore the constraint notifying personnel when appropriate. Should the algorithm be successful in acquiring enough subsets to satisfy the initial conditions, it will randomly select subsets that are within the threshold value until the constraint is met 1610.

Figure 20:
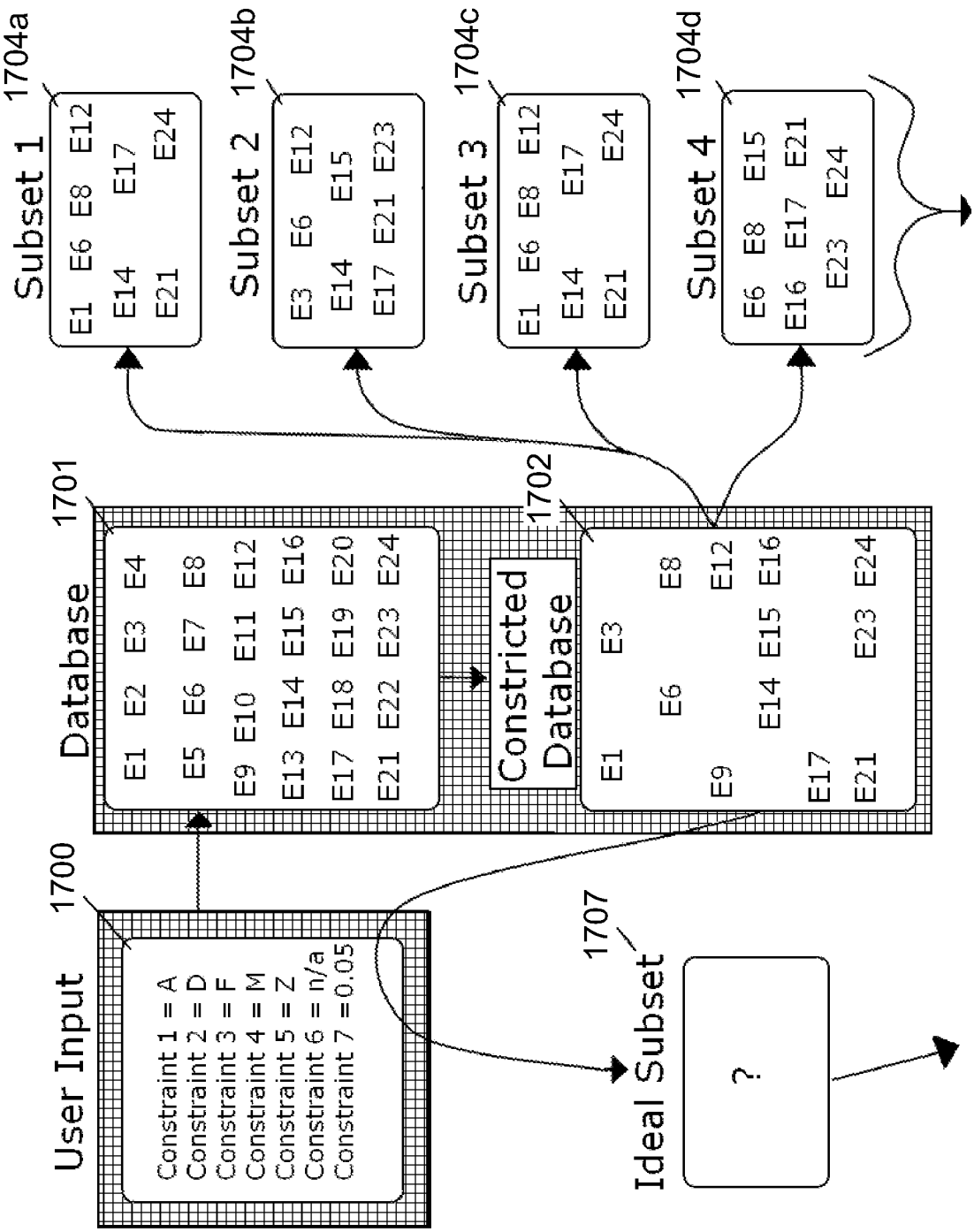
FIG. 20 is a flow chart showing the method of FIG. 14.

FIG. 20 outlines a constraining method similar, but opposite to that stated in FIG. 18 and FIG. 19. This process enables the user to add a constraint where the algorithm will restrict itself to how many random subsets it can allot for threshold comparison. When used in conjunction with the constraint used in FIG. 18, process 1600, the user can possibly draw a subset that is closer to the ideal, when only one output subset is desired faster than originally outlined. This gives a case where the constraints defined are not subject to only influencing the possible output subsets. The reader will note that as with FIG. 18, the algorithm will handle all processes from 1501 to 1511 as is outlined in FIG. 15 and FIG. 16.

Figure 21:
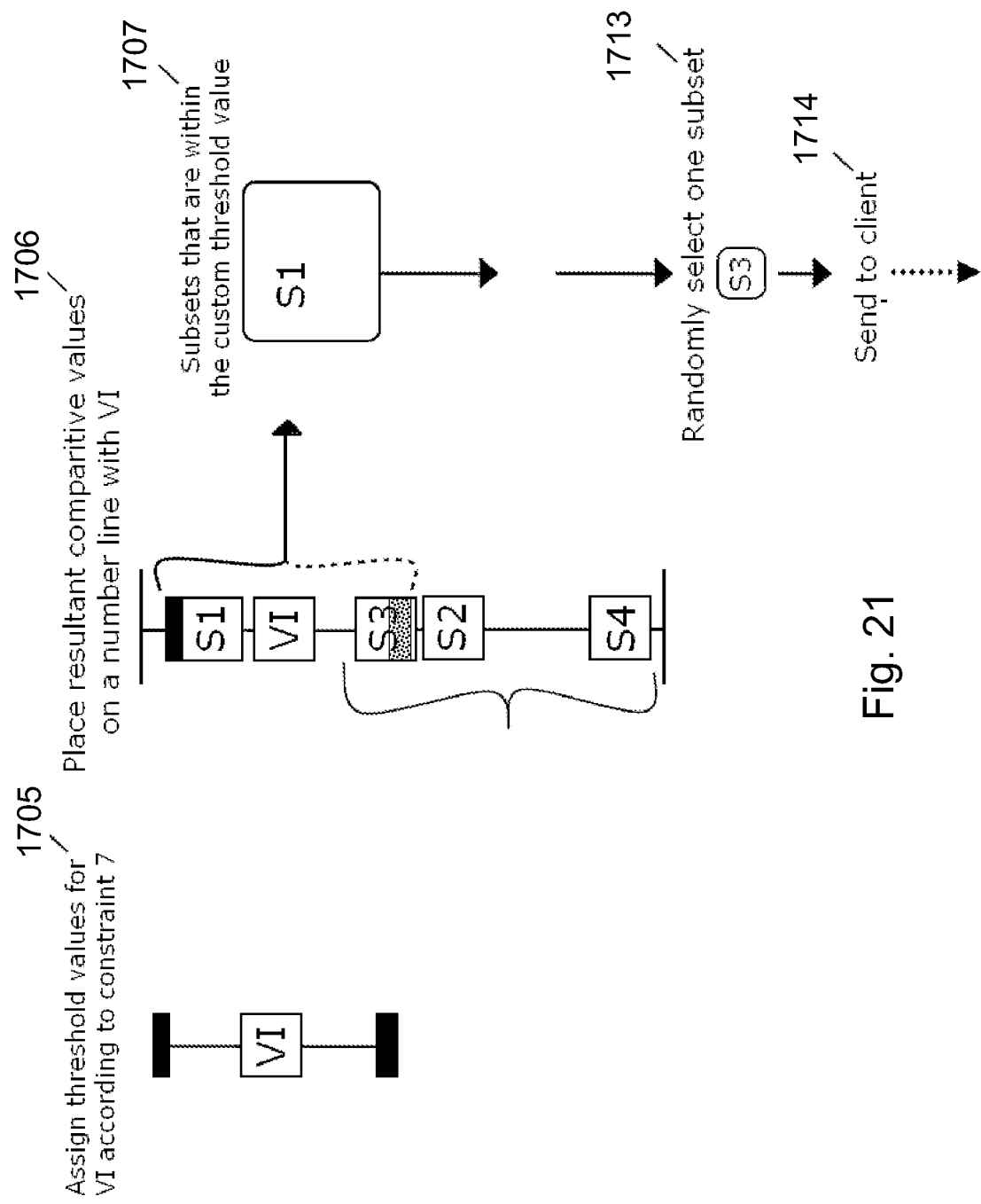
FIG. 21 is a flow chart showing the method of FIG. 14.

FIG. 21 continues FIG. 20 at the point in which constraint 7 in 1700 is used. Constraint 7 changes the threshold value 1705, and in this case it constricts the value causing the final results to be closer to the ideal. Subsets 2 and 4 are not within the threshold values, so they are sent to the trash. Subset 3 is on the border, so it is sent to a mutator 1706. The mutator 1706 is a sub property of the algorithm, where it will analyze the subset and determine what elements cause the most divergence, and will replace them with other elements such that the final comparative score of the subset will be within the threshold values 1707. The new subset 3 is now regarded to be equivalent to subset 1, which initially was within the threshold values and did not require mutation. The algorithm will select a qualifying subset randomly 1713 and send it to the client 1714.

Figure 22:
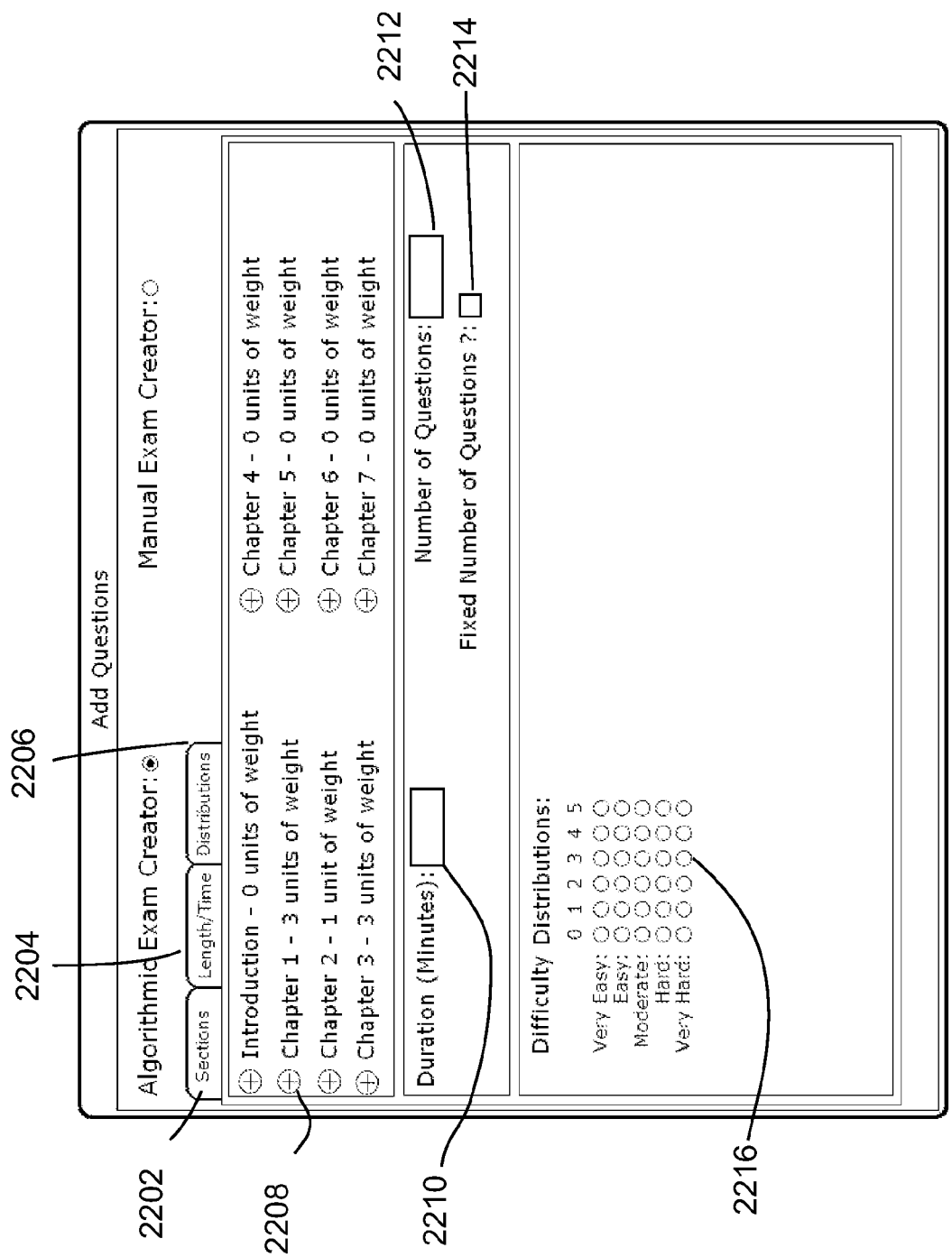
FIG. 22 is an example embodiment of a interface for a user generated learning tool.

FIG. 22 shows an exemplary interface for user generated learning tools. A user may select various desired sections 2202, the length or time of the exam 2204 and the distribution of weights of question difficulties 2206. The professor may select various weights for different chapters 2208. The professor may further select topics within a chapter of different weights. The duration 2210 and number of questions 2212 may be selected. The number of questions may also be fixed 2214. The difficulty of the questions may be selected 2216. In other embodiments, other characteristics of a learning tool may also be selected using a similar interface. Other types of learning tools may also be selected.

The methods described in this patent document may be carried out on any type of processor or computer system and may be stored on a computer program product comprising a non-transitive computer readable medium having encoded thereon computer executable instructions for implementing any of the methods described.

Immaterial modifications may be made to the embodiments described here without departing from what is covered by the claims.

In the claims, the word "comprising" is used in its inclusive sense and does not exclude other elements being present. The indefinite article "a" before a claim feature does not exclude more than one of the feature being present. Each one of the individual features described here may be used in one or more embodiments and is not, by virtue only of being described here, to be construed as essential to all embodiments as defined by the claims.

What is claimed is:

1. A method of generating learning tools within a computerized learning system, comprising:
storing a plurality of learning tools within a database, each one of the plurality of learning tools being associated with a plurality of characteristics;
obtaining observations through interaction of a user with the computerized learning system;
using a non-linear filter to update a conditional estimate of a signal representing a characteristic of the user based on the observations;
receiving a request in the form of a distribution of desired characteristics; and
using the conditional estimate of the signal, generating a subset of the plurality of learning tools having a plurality of characteristics satisfying the requested distribution of desired characteristics.

2. The method of claim 1 further comprising transmitting the generated subset of the plurality of learning tools to at least the user or a second user.

3. The method of claim 1 in which the distribution of desired characteristics are selected by the user.

4. The method of claim 1 in which generating a subset of the plurality of learning tools having a plurality of characteristics satisfying the distribution of desired characteristics is repeated for a plurality of users and in which the generated subsets of the plurality of learning tools for each of the plurality of users are unique.

5. The method of claim 4 in which each of the plurality of learning tools are generated after the occurrence of an event.

6. The method of claim 5 where the event is triggered by one of the plurality of users selecting an option.

7. The method of claim 6 in which selecting an option comprises clicking a labelled button on a display.

8. The method of claim 5 in which each of the plurality of learning tools are generated simultaneously for each user.

9. The method of claim 4 in which a locked subset of the subset of the plurality of learning tools is included within each of the subsets of the plurality of learning tools being generated for each of the plurality of users.

10. The method of claim 1 in which the subset of the plurality of learning tools are generated through a request by an individual user and the method further comprising distributing the plurality of generated learning tools to a plurality of additional users.

11. The method of claim 1 in which generating the subset of the plurality of learning tools satisfying the distribution of desired characteristics further comprises re-publishing a pre-existing subset of the plurality of learning tools which satisfies the distribution of desired characteristics.

12. The method of claim 1 in which the requested distribution of desired characteristics comprises scheduling characteristics.

13. The method of claim 1 in which the generated subset of the plurality of learning tools comprises courseware.

14. The method of claim 13 in which the courseware comprises a collection of both educational items and assessment items.

15. The method of claim 1 in which a previously generated plurality of learning tools has been generated before the at least one of the learning tool and the report is generated, and in which the distribution of desired characteristics is selected based on the previously generated plurality of learning tools.

16. The method of claim 1 in which the distribution of desired characteristics is selected based on a normalized filter variance distribution.

17. The method of claim 1 in which the distribution of desired characteristics is selected based on a determined probability of causing a desired action based on a filter estimate and model.

18. The method of claim 1 in which the distribution of desired characteristics is selected based on an optimal action strategy model.

19. The method of claim 1 in which the signal also represents a characteristic of a learning tool.

* * * * *